(12) United States Patent
Rhynard et al.

(10) Patent No.: US 11,851,185 B2
(45) Date of Patent: Dec. 26, 2023

(54) STOWAGE BIN LIGHTING ASSEMBLY AND METHOD FOR LIGHTING A STOWAGE BIN ASSEMBLY OF A VEHICLE

(71) Applicant: THE BOEING COMPANY, Chicago, IL (US)

(72) Inventors: Steven Ellis Rhynard, Mukilteo, WA (US); Joe Files, Arlington, WA (US); Adam Arthur Logue, Everett, WA (US); Long Hoang Duong, Seattle, WA (US); Kenneth Merkley Reynolds, Everett, WA (US); Jason W. Mullins, Edmonds, WA (US)

(73) Assignee: THE BOEING COMPANY, Chicago, IL (US)

( * ) Notice: Subject to any disclaimer, the term of this patent is extended or adjusted under 35 U.S.C. 154(b) by 79 days.

(21) Appl. No.: 17/586,882

(22) Filed: Jan. 28, 2022

(65) Prior Publication Data
US 2023/0242257 A1 Aug. 3, 2023

(51) Int. Cl.
*B64D 11/00* (2006.01)
(52) U.S. Cl.
CPC .... *B64D 11/003* (2013.01); *B64D 2011/0038* (2013.01); *B64D 2011/0046* (2013.01)
(58) Field of Classification Search
CPC .......... B61D 29/00; B60Q 3/225; B60Q 3/30; B60Q 3/43; B60Q 3/74; B64D 11/003; B64D 2011/0038
See application file for complete search history.

(56) References Cited

U.S. PATENT DOCUMENTS 5,108,048 A * 4/1992 Chang .................. B64D 11/003
244/118.1
5,752,760 A * 5/1998 Dealey, Jr. ............... B60Q 3/64
362/478

(Continued)

FOREIGN PATENT DOCUMENTS

EP 2304485 A2 4/2011
JP 2016186885 A 10/2016

(Continued)

OTHER PUBLICATIONS

Extended European Search Report for corresponding EP Application No. 23153629.3-1002 dated Jun. 2, 2023 (7 pages).

*Primary Examiner* — Alexander K Garlen
(74) *Attorney, Agent, or Firm* — THE SMALL PATENT LAW GROUP LLC; Jay J. Hoette

(57) ABSTRACT

A stowage bin lighting assembly for mounting to an internal cabin of a vehicle includes a chassis having a plate extending longitudinally between ends. The chassis supports light mount pedestals, wire standoffs, and at least one valance support above the upper surface. The stowage bin lighting assembly includes a light mounted to the light mount pedestals positioned above the plate by the light mount pedestals for providing lighting from the stowage bin assembly to the internal cabin of the vehicle. The stowage bin lighting assembly includes a wire electrically connected to the light to supply power to the light and coupled to at least one of the wire standoffs to control a position of the wire relative to the plate. The stowage bin lighting assembly includes a valance coupled to the valance mount pedestals configured to be coupled to the stowage bin assembly by the valance support.

47 Claims, 17 Drawing Sheets

(56) References Cited

U.S. PATENT DOCUMENTS

| | | | |
|---|---|---|---|
| 7,302,150 B2* | 11/2007 | Druckman | E05B 41/00 385/53 |
| 7,494,255 B2* | 2/2009 | Bryan | B60Q 3/43 362/490 |
| 10,914,457 B1* | 2/2021 | Camp | F21V 17/107 |
| 2014/0112014 A1* | 4/2014 | Lin | B60Q 3/47 362/520 |
| 2016/0091150 A1* | 3/2016 | Camp, III | F21V 13/04 362/351 |
| 2016/0214529 A1* | 7/2016 | Valentine, Jr. | B60Q 3/47 |
| 2020/0062401 A1* | 2/2020 | Walton | F21V 17/06 |

FOREIGN PATENT DOCUMENTS

| | | |
|---|---|---|
| WO | 2012133909 A1 | 10/2012 |
| WO | 2019123136 A2 | 6/2019 |

\* cited by examiner

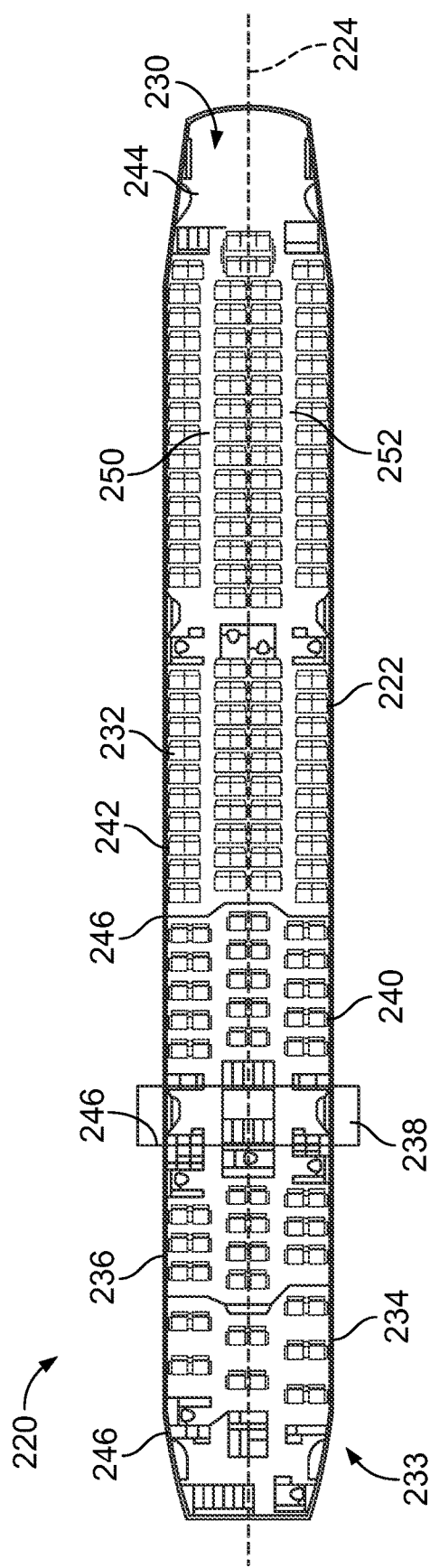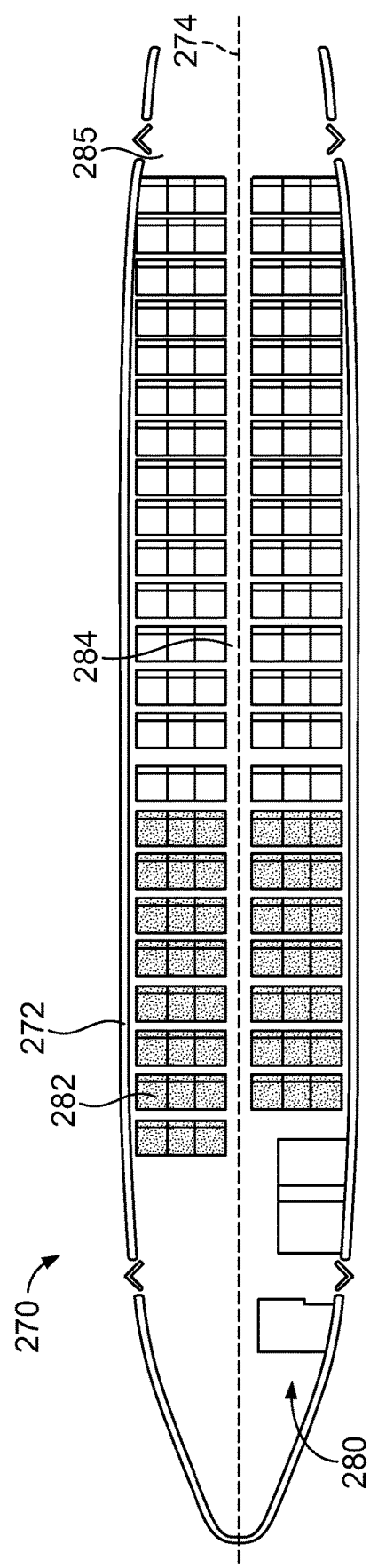
FIG. 2A
FIG. 2B

STOWAGE BIN LIGHTING ASSEMBLY AND METHOD FOR LIGHTING A STOWAGE BIN ASSEMBLY OF A VEHICLE

FIELD OF THE DISCLOSURE

Embodiments of the present disclosure generally relate to lighting for stowage bin assemblies for internal cabins of aircraft.

BACKGROUND OF THE DISCLOSURE

Vehicles, such as commercial aircraft, are used to transport passengers between various locations. Stowage bin assemblies are provided within internal cabins of commercial aircraft overhead above passenger seats in the aircraft. Typically, lights are provided above the stowage bin assemblies to provide accent and area lighting within the cabin of the aircraft. The trend in aircraft lighting is toward more complex lighting architectures for enhanced mood lighting and other lighting effects. For example, lighting architectures in aircraft include increased quantity of lights and complexity of the light layouts with additional lighting controllers, precise integration and aiming requirements, and limited space in which to package the components. However, installation and service of the lights and wires in the aircraft is time consuming due to space constraints above the stowage bin assemblies. Additionally, there is a trend toward increased scrutiny on electrical wiring by regulatory agencies to ensure safe and trouble-free operation of the lighting and wiring systems for the life of the aircraft. Space constraints and location of the lighting and wiring above the stowage bin assemblies make inspection of the lights and wiring difficult.

The wiring and lights are typically hidden behind a valance, which provides a decorative covering for the lighting and wiring components. Attachment of valances may be difficult. Additionally, it may be difficult to inspect the valance attachment components during installation due to the limited space and covering of the visible space by the valance.

SUMMARY OF THE DISCLOSURE

A need exists for a system and a method for installing lighting components and a valance within an internal cabin of an aircraft. Moreover, a need exists for a system and a method that allows for ease of installation of lighting and valance components to a stowage bin assembly in an aircraft. Further, a need exists for a system and a method for allowing installation of different lighting and valance configurations onto different stowage bin assemblies due to changes in the shape of the cabin along the fuselage.

With those needs in mind, certain embodiments provide a stowage bin lighting assembly for mounting to an internal cabin of a vehicle. The stowage bin lighting assembly includes a chassis including a plate extending longitudinally between a first end and a second end and configured to be mounted to a stowage bin assembly of the internal cabin. The chassis supports light mount pedestals and wire standoffs. The stowage bin lighting assembly includes a light assembly removably coupled to the chassis. The light assembly includes a light and a wire electrically connected to the light. The light is coupled to the light mount pedestals for providing lighting from the stowage bin assembly to the internal cabin of the vehicle. The wire supplies power and/or data to the light and is coupled to at least one of the wire standoffs to control a position of the wire.

In at least one example, the light and the wire of the stowage bin lighting assembly are pre-assembled to the chassis prior to mounting the chassis to the stowage bin assembly.

In at least one example, the light mount pedestals of the stowage bin lighting assembly provide multiple attachment points for the light and the plate maintains spacing of the light mount pedestals relative to each other. In various examples, each light mount pedestal includes an alignment mounting feature supporting a portion of the light. The alignment mounting features may be offset relative to each other and relative to a longitudinal fuselage axis of the vehicle. The alignment mounting features of the light mount pedestals may define a longitudinal mounting axis tapered transversely relative to the longitudinal fuselage axis. The light is held along the longitudinal mounting axis. Each alignment mounting feature may have a height that is different from a height of at least one other alignment mounting feature to vertically taper the longitudinal mounting axis relative to the longitudinal fuselage axis. Each alignment mounting feature may include an angled mounting surface formed at an angle relative to an upper surface of the plate. The angled mounting surface may be formed at a different angle relative to at least one other angled mounting surface. All the angled mounting surfaces define the longitudinal mounting axis. In various examples, the light mount pedestals have different heights to locate the light at different distances from an upper surface of the plate.

In at least one example, the plate of the stowage bin lighting assembly includes a step feature configured to span across a gap from the stowage bin assembly to an adjacent stowage bin assembly.

In at least one example, the chassis of the stowage bin lighting assembly includes a wire guide boss extending from an upper surface of the plate supporting a wire guide on the chassis for controlling routing of the wire between the light and the wire standoffs.

In at least one example, the wire is coiled around at least two of the wire standoffs.

In at least one example, the chassis of the stowage bin lighting assembly includes a wire disconnect mounting bracket. The wire has a wire disconnect at an end of the wire that is coupled to the wire disconnect mounting bracket to position the wire disconnect relative to the chassis.

In at least one example, the light is a first light. The light assembly further includes a second light mounted to the corresponding light mount pedestals. The light mount pedestals position the first light adjacent the second light on the chassis. The first light extends along a first axis and the second light extends along a second axis. The light mount pedestals may hold the first and second lights with the first axis congruent with the second axis.

In at least one example, the light mount pedestals are integral with the plate.

In at least one example, the chassis of the stowage bin lighting assembly includes at least one valance support supported by the chassis. A valance is coupled to the at least one valance support. The valance is configured to be coupled to the stowage bin assembly by the valance support. In an example, the valance support includes a rail and a plurality of spring clips coupled to the rail. A lower edge of the valance is coupled between the rail and the spring clips. The rail may include a lip. The spring clips may include mounting ends coupled to the rail and clip ends opposite the mounting ends facing the lip. The lower edge of the valance may be captured between the lip and the clip ends of the spring clips. In an example, the valance includes a valance panel including an inner surface and an outer surface. The inner surface forms a valance pocket. The valance includes ribs in the valance pocket supporting the valance panel. The ribs may include cam surfaces configured to engage guide rollers extending from the stowage bin assembly to control mating of the valance to the valance support. In an example, the valance support includes valance latches. The valance is latchably coupled to the valance latches. In an example, the chassis further includes valance mount pedestals extending from an upper surface of the plate. The valance latches are coupled to the corresponding valance mount pedestals. The valance mount pedestals position the plurality of valance latches relative to the plate. In an example, each valance mount pedestal includes an alignment mounting feature supporting the corresponding valance latch. The alignment mounting features are offset relative to each other and relative to a longitudinal fuselage axis of the vehicle. The alignment mounting features of the valance mount pedestals may define a longitudinal mounting axis tapered transversely relative to the longitudinal fuselage axis. The valance is held along the longitudinal mounting axis.

Certain embodiments provide a stowage bin lighting assembly for mounting to an internal cabin of a vehicle. The stowage bin lighting assembly includes a chassis including a plate extending longitudinally between a first end and a second end. The plate has an upper surface and a lower surface configured to be mounted to a stowage bin assembly of the internal cabin. The chassis supports light mount pedestals above the upper surface. The chassis supports wire standoffs above the upper surface. The chassis supports at least one valance support above the upper surface. The stowage bin lighting assembly includes a light mounted to the light mount pedestals. The light is positioned above the plate by the light mount pedestals for providing lighting from the stowage bin assembly to the internal cabin of the vehicle. The stowage bin lighting assembly includes a wire electrically connected to the light to supply power to the light. The wire is coupled to at least one of the wire standoffs to control a position of the wire relative to the plate. The stowage bin lighting assembly includes a valance coupled to the valance mount pedestals. The valance is configured to be coupled to the stowage bin assembly by the valance support.

Certain embodiments provide a vehicle having an internal cabin having a ceiling, a plurality of stowage bin assemblies within the internal cabin each having an upper portion facing the ceiling, and a plurality of stowage bin lighting assemblies coupled to the stowage bin assemblies at the upper portions of the corresponding stowage bin assemblies. Each stowage bin lighting assembly includes a chassis including a plate extending longitudinally between a first end and a second end. The chassis is mounted to the corresponding stowage bin assembly of the internal cabin. The chassis supports light mount pedestals and wire standoffs. Each stowage bin lighting assembly includes a light assembly removably coupled to the chassis. The light assembly includes a light and a wire electrically connected to the light. The light is coupled to the light mount pedestals for providing lighting from the stowage bin assembly to the internal cabin of the vehicle. The wire supplies power and/or data to the light. The wire is coupled to at least one of the wire standoffs to control a position of the wire.

Certain embodiments provide a vehicle including an internal cabin having a ceiling, a stowage bin assembly within the internal cabin, and a stowage bin lighting assembly. The stowage bin assembly has an upper portion facing the ceiling and a pocket formed between the upper portion of the stowage bin assembly and the ceiling. The stowage bin lighting assembly is received in the pocket. The stowage bin lighting assembly includes an upper light assembly, a lower light assembly, and a valance coupled between the upper light assembly and the lower light assembly. The upper light assembly includes an upper chassis coupled to the upper portion of the stowage bin assembly. The upper chassis includes an upper plate extending longitudinally between a first end and a second end. The upper chassis supports upper light mount pedestals above the upper plate. The upper light assembly includes an upper light mounted to the upper light mount pedestals. The upper chassis supports upper valance latches above the upper chassis. The lower light assembly includes a lower chassis coupled to the upper portion of the stowage bin assembly independent from the upper chassis. The lower chassis includes a lower plate extending longitudinally between a first end and a second end. The lower chassis supports lower light mount pedestals above the lower plate. The lower light assembly includes a lower light mounted to the lower light mount pedestals. The lower chassis supports a lower valance support above the lower chassis. The valance is coupled to the lower valance support and coupled to the upper valance latches to control a position of the valance relative to the stowage bin assembly.

Certain embodiments of the present disclosure provide a method of lighting a stowage bin assembly in an internal cabin of an aircraft. The method includes the steps of coupling a light to a plurality of light mount pedestals extending from a chassis at a location outside of the internal cabin, coupling a wire extending from the light to a plurality of wire standoffs extending from the chassis at a location outside of the internal cabin, and mounting the chassis to an upper portion of the stowage bin assembly inside the internal cabin to locate the light and the wire above the stowage bin assembly.

In at least one example, the method includes the step of inspecting the installation of the light and the wire on the chassis at a location outside of the internal cabin prior to mounting the chassis to the upper portion of the stowage bin assembly.

In at least one example, the method includes the steps of unmounting the chassis, with the light and the wire mounted to the chassis, from the stowage bin assembly, removing the chassis, with the light and the wire mounted to the chassis, from the internal cabin, replacing the light and the wire on the chassis, and mounting the chassis, with the replaced light and wire, to an upper portion of the stowage bin assembly inside the internal cabin to locate the light and the wire above the stowage bin assembly.

In at least one example, the method includes the step of coupling at least one valance support to the chassis at a location outside of the internal cabin and coupling a valance to the at least one valance support to secure the valance to the stowage bin assembly and cover the pocket. The at least one valance support may include a valance latch and the valance may include a cam surface. The step of coupling the valance to the at least one valance support includes engaging the cam surface with a guide roller to guide mating of the valance with the valance latch.

In at least one example, the step of mounting the chassis to the upper portion of the stowage bin assembly includes mounting the chassis to the upper portion of the stowage bin assembly such that the light is held along a longitudinal mounting axis tapered transversely relative to a longitudinal fuselage axis of the internal cabin.

BRIEF DESCRIPTION OF THE DRAWINGS

FIG. 2A illustrates a top plan view of an internal cabin of an aircraft, according to an embodiment of the present disclosure.

FIG. 2B illustrates a top plan view of an internal cabin of an aircraft, according to an embodiment of the present disclosure.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

As described herein, embodiments of the present disclosure provide systems and methods for installing lighting components and valances within an internal cabin of an aircraft. In particular, the lighting components may be pre-assembled prior to being mounted to a stowage bin assembly in an aircraft. Further, in at least one embodiment, the mounting hardware, light(s), wires, wire disconnects, and the like may be pre-assembled onto a chassis prior to loading the chassis into the space above the stowage bin assembly. Accordingly, embodiments of the present disclosure allow proper positioning of the components relative to each other and inspection of the components prior loading into the aircraft. Further, a valance may be installed once the chassis and mounting hardware is coupled to the stowage bin assembly.

Figure 1:
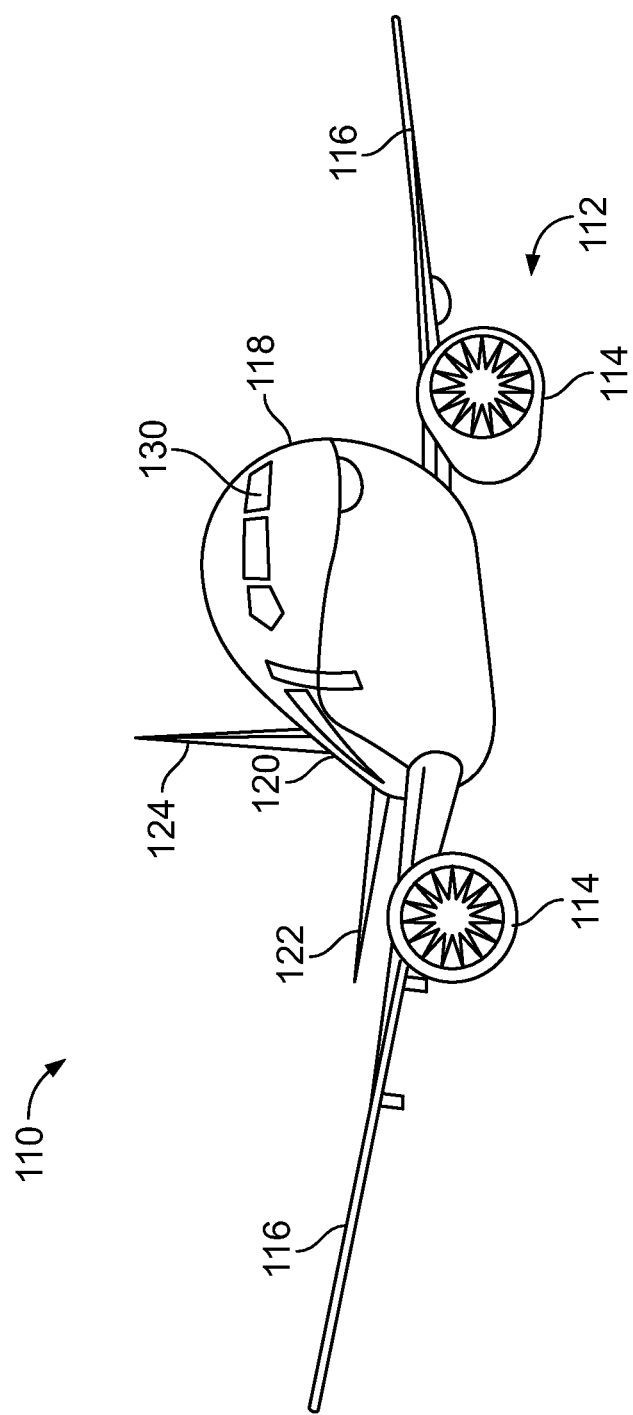
FIG. 1 is illustrates a perspective front view of an aircraft 110, according to an embodiment of the present disclosure.

FIG. 1 illustrates a perspective front view of an aircraft 110, according to an embodiment of the present disclosure. The aircraft 110 includes a propulsion system 112 that includes engines 114, for example. Optionally, the propulsion system 112 may include more engines 114 than shown. The engines 114 are carried by wings 116 of the aircraft 110. In other embodiments, the engines 114 may be carried by a fuselage 118 and/or an empennage 120. The empennage 120 may also support horizontal stabilizers 122 and a vertical stabilizer 124.

The fuselage 118 of the aircraft 110 defines an internal cabin 130, which includes a flight deck or cockpit, one or more work sections (for example, galleys, personnel carry-on baggage areas, and the like), one or more passenger sections (for example, first class, business class, and coach sections), one or more lavatories, and/or the like. The internal cabin 130 includes stowage bin assemblies, such as in the passenger sections. Lighting is provided in the internal cabin 130, such as above the stowage bin assemblies.

Alternatively, instead of an aircraft, embodiments of the present disclosure may be used with various other vehicles, such as automobiles, buses, locomotives and train cars, watercraft, and the like. Further, embodiments of the present disclosure may be used with respect to fixed structures, such as commercial and residential buildings.

FIG. 2A illustrates a top plan view of an internal cabin 230 of an aircraft, according to an embodiment of the present disclosure. The internal cabin 230 is an example of the internal cabin 130 of FIG. 1. The internal cabin 230 is within a fuselage 220 of the aircraft. For example, one or more fuselage walls 222 may define the internal cabin 230. The fuselage 220 extends along a longitudinal fuselage axis 224. A longitudinal fuselage plane is defined as a vertical plane extending through the longitudinal fuselage axis 224. Portions of the walls may extend parallel to the longitudinal fuselage axis 224. In various embodiments, portions of the fuselage may have a non-constant cross section. For example, portions of the fuselage walls 222 may be tapered inwardly and/or downwardly extending transverse to the longitudinal fuselage axis 224, such as proximate to the front of the aircraft and the aft of the aircraft. In the illustrated embodiment, the non-constant cross section of the aircraft is located in the forward portion of the aircraft. For example, the fuselage walls 222 may be tapered inward at approximately 3° along at least a portion of the length of the aircraft. Components, such as the stowage bins, lighting systems and valances are similarly tapered to follow the tapering of the fuselage walls 222.

The internal cabin 230 includes multiple areas, including a front section 233, a first-class section 234, a business class section 236, a front galley station 238, an expanded economy or coach section 240, a standard economy of coach section 242, and an aft section 244. It is to be understood that the internal cabin 230 may include more or less areas than shown. For example, the internal cabin 230 may not include a first-class section, and may include more or less galley stations than shown. Each of the sections may be separated by a cabin transition area 246, which may include class divider assemblies between aisles.

As shown in FIG. 2A, the internal cabin 230 includes two aisles 250 and 252 that lead to the aft section 244. Optionally, the internal cabin 230 may have less or more aisles than shown. For example, the internal cabin 230 may include a single aisle that extends through the center of the internal cabin 230 that leads to the aft section 244.

Stowage bin assemblies (not shown) can be disposed within the internal cabin 230. For example, the stowage bin assemblies may be provided above passenger seats 232 in the passenger sections of the aircraft. The outboard stowage bin assemblies may be provided over the passenger seats 232 along the fuselage walls 222 of the internal cabin 230. Central stowage bin assemblies may be provided over the passenger seats 232 along the central section of the internal cabin 230, for example, proximate to the longitudinal fuselage axis 224.

FIG. 2B illustrates a top plan view of an internal cabin 280 of an aircraft, according to an embodiment of the present disclosure. The internal cabin 280 is an example of the internal cabin 130 shown in FIG. 1. The internal cabin 280 may be within a fuselage 270 of the aircraft. For example, one or more fuselage walls 272 extend along a longitudinal fuselage axis 274. The fuselage walls 272 define the internal cabin 280. The internal cabin 280 includes multiple areas, including a main cabin 282 having passenger seats, and an aft section 285 behind the main cabin 282. It is to be understood that the internal cabin 280 may include more or less areas than shown.

The internal cabin 280 may include a single aisle 284 that leads to the aft section 285. The single aisle 284 may extend through the center of the internal cabin 280 that leads to the aft section 285. For example, the single aisle 284 may be coaxially aligned with a central longitudinal plane of the internal cabin 280.

Stowage bin assemblies (not shown) can be disposed within the internal cabin 280. For example, the stowage bin assemblies may be provided above the passenger seats in the passenger sections of the aircraft. Outboard stowage bin assemblies may be provided over the passenger seats along the outer sides of the internal cabin 280.

Figure 3:
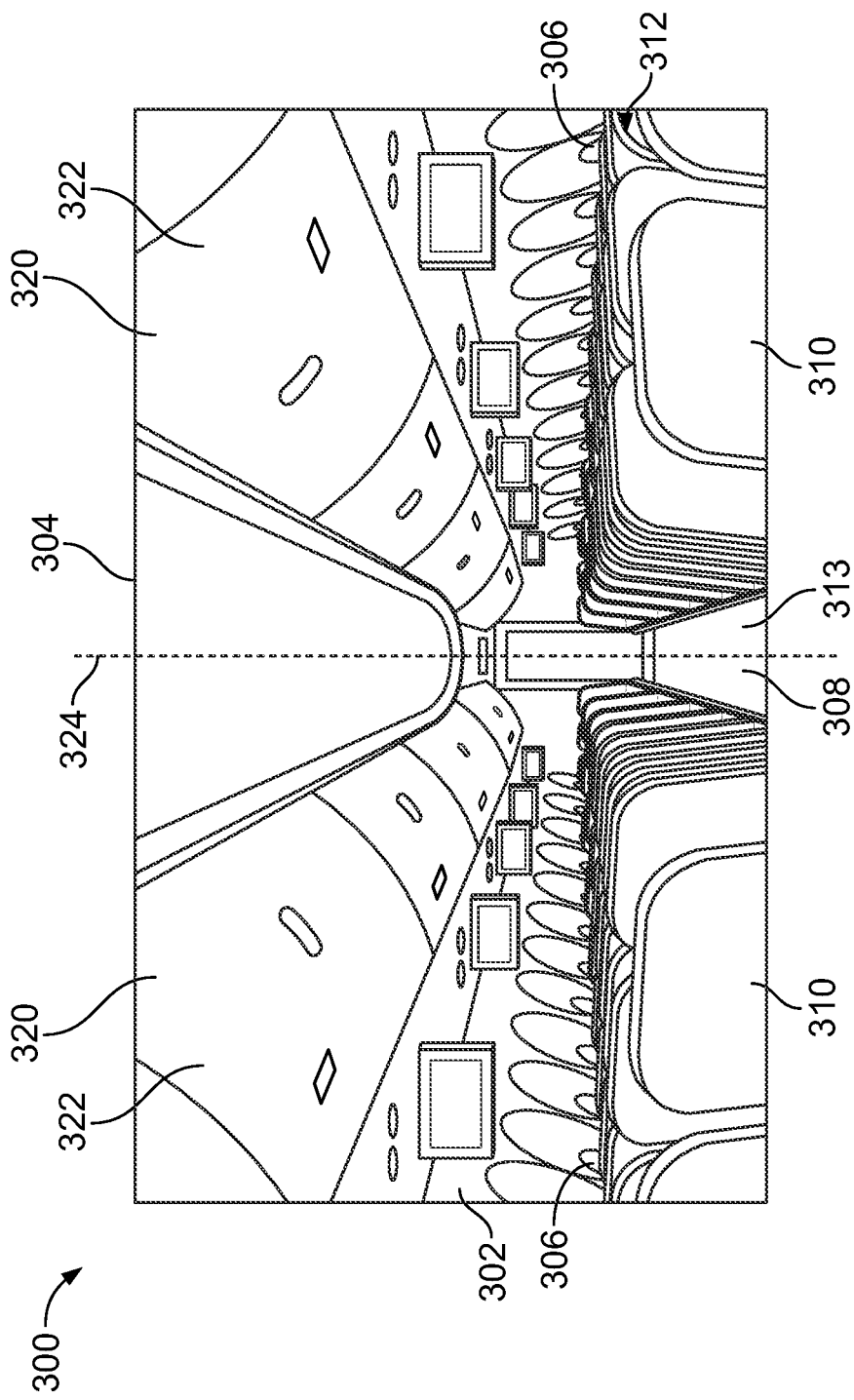
FIG. 3 illustrates a perspective interior view of an internal cabin of an aircraft, according to an embodiment of the present disclosure.

FIG. 3 illustrates a perspective interior view of an internal cabin 300 of an aircraft, according to an embodiment of the present disclosure. The internal cabin 300 is an example of the internal cabin 130 shown in FIG. 1. The internal cabin 300 includes outboard walls 302 connected to a ceiling 304. Windows 306 may be formed within the outboard walls 302. A floor 308 supports rows of seats 310. As shown in FIG. 3, a row 312 may include three seats 310 on either side of an aisle 313. However, the row 312 may include more or less seats 310 than shown. Additionally, the internal cabin 300 may include more aisles than shown.

Overhead stowage bin assemblies 320 are secured to the ceiling 304 and/or the outboard wall 302, generally above the passenger seats 310. In various examples, each stowage bin assembly 320 may include a pivot bin or bucket 322 pivotally secured to a strongback (not shown). The overhead stowage bin assemblies 320 are configured to be pivoted open in order to receive passenger carry-on baggage and personal items, for example. However, other types of stowage bin assemblies may be used in alternative embodiments, such as closeouts, shelf bins, hangers, or other examples having various panels without a pivot bin to store luggage. The stowage bin assemblies 320 are located on either side of the aisle 313. The overhead stowage bin assemblies 320 extend between the front and rear end of the internal cabin 300. Lighting assemblies (not shown) are provided above the stowage bin assemblies 320 to provide lighting along the stowage bin assemblies 320 and/or the ceiling 304. The stowage bin assemblies 320 follow the outboard walls 302 along the internal cabin 300. In various examples, the outboard walls 302 may be tapered inward and/or tapered downward at the front of the aircraft (for example, following the curvature of the fuselage). The stowage bin assemblies 320 and the lighting are tapered inward and/or tapered downward to follow the outboard walls 302. The stowage bin assemblies 320 and the lighting are tapered to follow the non-constant cross section of the aircraft.

As used herein, the term "outboard" means a position that is further away from a central longitudinal plane 324 of the internal cabin 300 as compared to another component. The term "inboard" means a position that is closer to the central longitudinal plane 324 of the internal cabin 300 as compared to another component.

Figure 4:
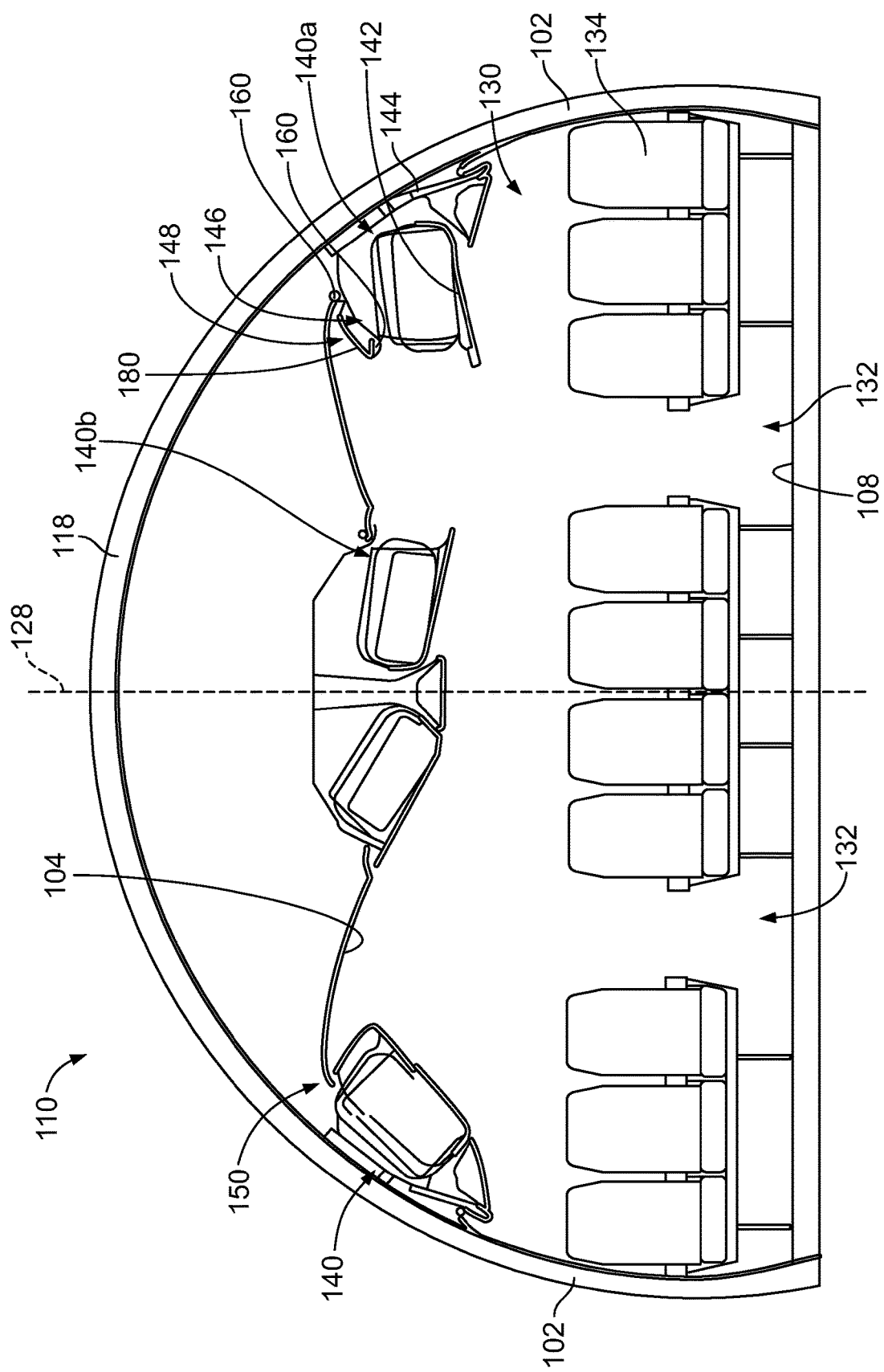
FIG. 4 is an internal view of the internal cabin of the aircraft, according to an embodiment of the present disclosure.

FIG. 4 is an internal view of the internal cabin 130 of the aircraft 110, according to an embodiment of the present disclosure. The aircraft 110 include multiple aisles 132. Passenger seats 134 are mounted to a floor 108 of the internal cabin 130. The passenger seats 134 are disposed to each side of the aisles 132, such as along outboard walls 102 of the fuselage 118.

Stowage bin assemblies 140 are provided along a ceiling 104 of the internal cabin 130. For example, the aircraft 110 includes outboard stowage bin assemblies 140a proximate to the outboard walls 102 and central stowage bin assemblies 140b proximate to a central longitudinal plane 128. Each stowage bin assembly 140 includes a moveable portion 142 moveably coupled to a strongback 144. For example, the moveable portion 142 may include a pivot bin. The stowage bin assemblies 140 may include closeouts, such as PSU closeouts, in various embodiments having various panels without a pivot bin to store luggage. Other types of assemblies may be used in alternative embodiments, such as shelf bins, hangers, or other examples having various panels without a pivot bin to store luggage.

The aircraft 110 includes a stowage bin lighting assembly 150 for lighting the internal cabin 130, such as the ceiling 104. The stowage bin lighting assembly 150 may provide various lighting effects, such as generally lighting, enhanced mood lighting, and other lighting effects. The stowage bin lighting assembly 150 is coupled to the stowage bin assemblies 140. For example, the stowage bin lighting assembly 150 may be coupled to upper portions 146 of the stowage bin assemblies 140. The stowage bin lighting assembly 150 is located in a pocket 148 between the upper portion 146 and the ceiling 104. In an exemplary embodiment, the stowage bin lighting assembly 150 includes lights 160 for illuminating the internal cabin 130, such as the ceiling 104. In an exemplary embodiment, a valance 180 is used to hide or cover the components of the stowage bin lighting assembly 150 in the pocket 148. The valance 180 is located above the corresponding stowage bin assembly 140, such as proximate to the ceiling 104. The valance 180 may transition between the stowage bin assembly 140 and the ceiling 104.

Figure 5:
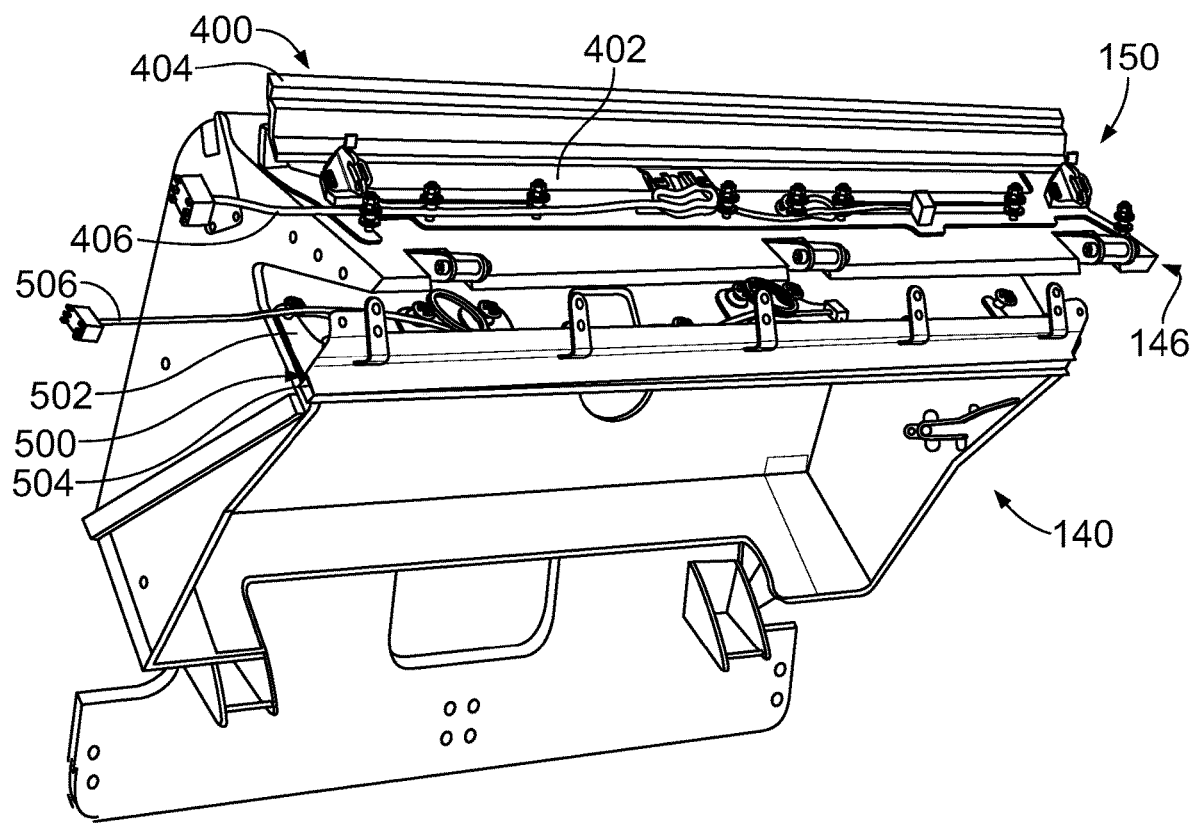
FIG. 5 illustrates a portion of the stowage bin lighting assembly coupled to the stowage bin assembly, according to an embodiment of the present disclosure.
Figure 6:
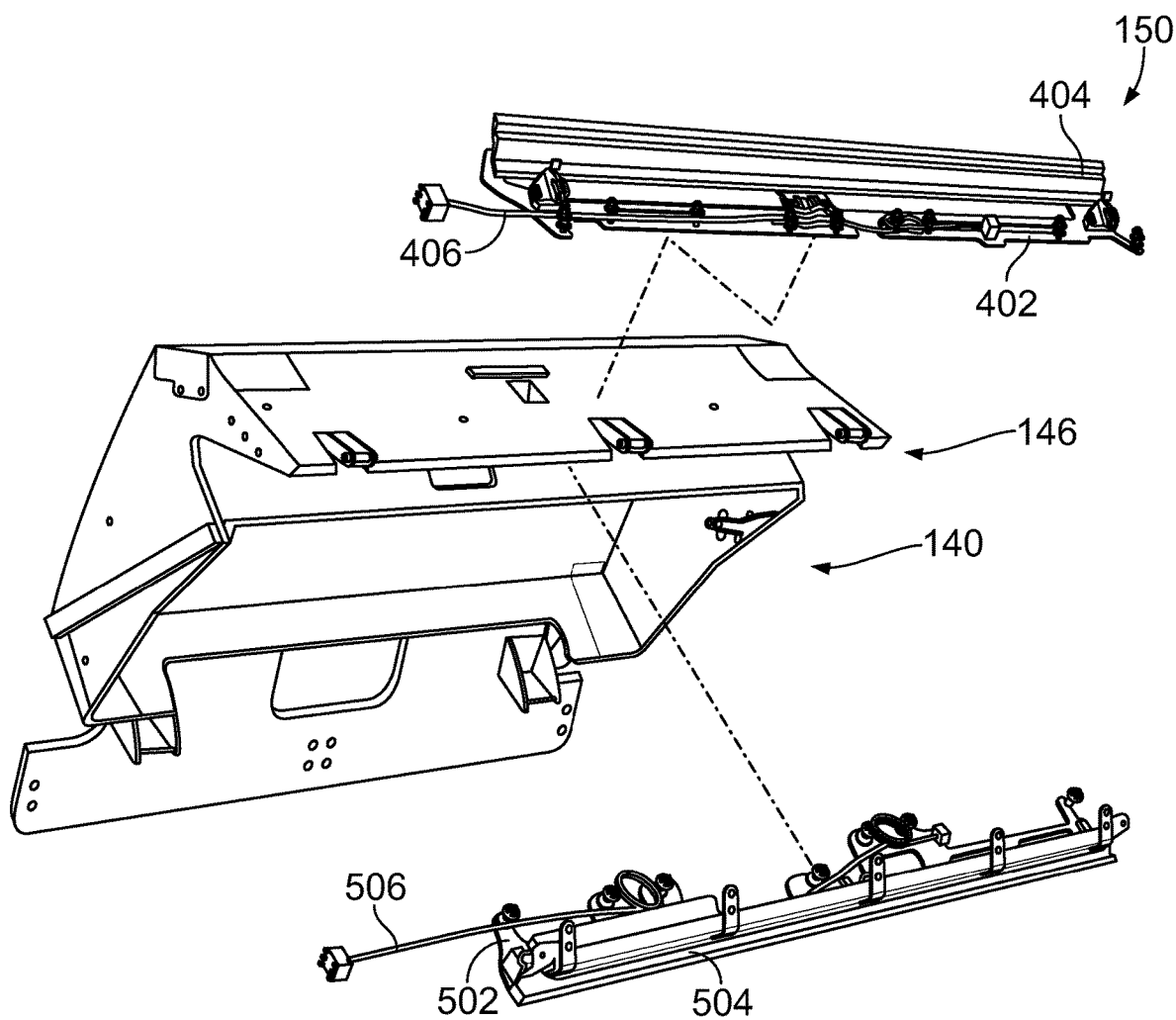
FIG. 6 is an exploded view of a portion of the stowage bin lighting assembly poised for mounting to the stowage bin assembly, according to an embodiment of the present disclosure.

FIG. 5 illustrates a portion of the stowage bin lighting assembly 150 coupled to the stowage bin assembly 140, according to an embodiment of the present disclosure. FIG. 6 is an exploded view of a portion of the stowage bin lighting assembly 150 poised for mounting to the stowage bin assembly 140, according to an embodiment of the present disclosure.

In various examples, the stowage bin lighting assembly 150 includes multiple light assemblies associated with the stowage bin assembly 140 to provide lighting in different directions or for lighting different areas of the internal cabin 130 (shown in FIG. 4). In other various examples, the stowage bin lighting assembly 150 includes a single light assembly associated with the stowage bin assembly 140. In yet further examples, one or more light assemblies may be used to provide lighting for multiple stowage bin assemblies 140.

In the illustrated embodiment, the stowage bin lighting assembly 150 includes an upper light assembly 400 and a lower light assembly 500. The upper light assembly 400 and the lower light assembly 500 are configured to be separately mounted to the stowage bin assembly 140, such as at different locations along the upper portion 146 of the stowage bin assembly 140. The upper and lower light assemblies 400, 500 are used for lighting different portions of the stowage bin assembly 140 and/or different portions of the ceiling of the aircraft 110. The upper and lower light assemblies 400, 500 may include similar components, which may be referenced herein specifically with the "upper" and "lower" identifiers or may be referenced herein generally without the "upper" and "lower" identifiers. In an exemplary embodiment, the upper and lower light assemblies 400, 500 are configured to support the valance 180 (shown in FIG. 4) of the stowage bin lighting assembly 150.

In an exemplary embodiment, the stowage bin lighting assembly 150 includes an upper chassis 402 used to support the upper light assembly 400 and a lower chassis 502 used to support the lower light assembly 500. The upper chassis 402 and the lower chassis 502 are each configured to be directly mounted to the upper portion 146 of the stowage bin assembly 140. The upper light assembly 400 includes an upper light 404 and one or more upper wires 406 extending from the upper light 404. In an exemplary embodiment, the upper light 404 and the upper wires 406 are preassembled to the upper chassis 402 prior to mounting the upper chassis 402 to the stowage bin assembly 140. The lower light assembly 500 includes a lower light 504 and one or more lower wires 506 extending from the lower light 504. In an exemplary embodiment, the lower light 504 and the lower wires 506 are preassembled to the lower chassis 502 prior to mounting the lower chassis 502 to the stowage bin assembly 140. In an exemplary embodiment, the assembly may occur outside of the aircraft 110, such as on an assembly bench, where assembly may occur more easily. For example, the lighting and the wiring may be assembled to the chassis 402, 502 in a controlled environment with plenty of room around the chassis 402, 502 to access the components and complete assembly. Inspection of the lighting and the wiring may occur outside of the aircraft 110 prior to mounting the chassis 402, 502, with the lights 404, 504 and wires 406, 506, respectively, to the stowage bin assembly 140. As such, assembly time inside the aircraft 110, and thus downtime of the aircraft 110, may be reduced. The wiring is inspected and confirmed to meet electrical wiring requirements (for example, positioning, bend radius, proximity to other components) prior to mounting to the stowage bin assembly 140. The lights 404, 504 and wires 406, 506 are removably coupled to the chassis 402, 502, such as for repair or replacement.

Figure 7:
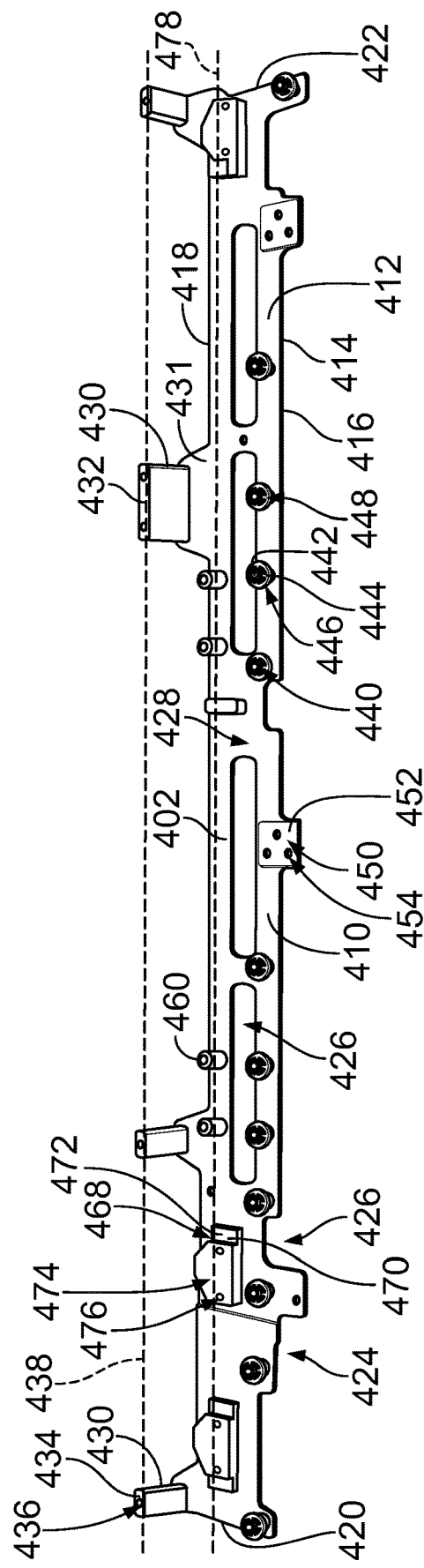
FIG. 7 is a top perspective view of the upper chassis in accordance with an exemplary embodiment.

FIG. 7 is a top perspective view of the upper chassis 402 in accordance with an exemplary embodiment. The chassis 402 includes an upper plate 410 configured to be mounted to the stowage bin assembly 140 (shown in FIG. 5) and configured to support the components of the upper light assembly 400. For example, the plate 410 includes an upper surface 412 for supporting the components and a lower surface 414 configured to be mounted directly to the stowage bin assembly 140.

In an exemplary embodiment, the plate 410 is manufactured from a metal material, such as aluminum. The plate 410 may be machined from a metal block or sheet. The features and mounting locations may be precisely controlled by the machining process. In other examples, the plate 410 may be diecast. In alternative embodiments, the plate 410 is manufactured from a plastic material. For example, the plate 410 may be molded from a plastic material. The plate 410 is manufactured to have specific dimensions and features for supporting and precisely positioning the components of the upper light assembly 400 relative to each other and relative to the stowage bin assembly 140.

In various embodiments, the plate 410 is generally planar and extends along a longitudinal plate axis 415 between a first end 416 and a second end 418. The plate 410 has a first side 420 and a second side 422. The first side 420 may define a front side and the second side 422 may define a rear side of the plate 410. In various embodiments, the plate 410 may include one or more steps 424 to change an elevation of the plate 410 along the length of the plate 410. For example, the step 424 may be used to transition over a portion of the stowage bin assembly 140 or to transition across to adjacent stowage bin assemblies 140.

The plate 410 includes cutouts 426 through the plate 410, such as to reduce weight of the plate 410 or to accommodate features of the stowage bin assembly 140. The cutouts 426 may be internal, such as along the central longitudinal axis of the plate 410 or may be external, such as along the first side 420 and/or the second side 422.

The plate 410 includes mounting openings 428 that receive fasteners (not shown) for securing the plate 410 to the stowage bin assembly 140. Other types of securing features may be used in alternative embodiments, such as latches, clips, or other securing features. Optionally, nut plates (not shown) may be coupled to the plate 410 at the mounting openings 428. The nut plates are configured to receive threaded fasteners to secure the plate 410 to the stowage bin assembly 140. For example, the nut plates may receive the threaded ends of fasteners that are assembled from below, such as from an interior of the stowage bin assembly 140 rather than requiring assembly of the fasteners from above the chassis 402.

In an exemplary embodiment, the chassis 402 includes light mount pedestals 430 extending from the upper surface 412 of the plate 410. The light mount pedestals 430 are used to support the light 404 (shown in FIGS. 5 and 6) of the upper light assembly 400. In an exemplary embodiment, the light mount pedestals 430 are integral with the plate 410. For example, the light mount pedestals 430 may be diecast with the plate 410 or machined from the metal block with the plate 410. In other examples, the light mount pedestals 430 are separate and discrete from the plate 410 and coupled to the plate 410, such as using fasteners. The light mount pedestals 430 are spaced apart along the plate 410. The plate 410 maintains relative spacing of the light mount pedestals 430. In various embodiments, the light mount pedestals 430 may be located at the second side 422 (for example, rear side); however, other locations are possible in alternative embodiments, such as at the first side 420 or centered between the first and second sides 420, 422. In the illustrated embodiment, the light mount pedestals 430 extend from tabs 431, which extend from the second side 422 to position the light mount pedestals 430 outside of the footprint of the plate 410. In an exemplary embodiment, the chassis 402 includes a plurality of the light mount pedestals 430 sufficient for supporting the light 404. In other words, a separate chassis 402 is not needed to support the light 404. Rather, the chassis 402 supports the entire length of the light 404. In various embodiments, the chassis 402 may support multiple lights 404.

Each light mount pedestal 430 extends from the plate 410 to a distal end 432. The light mount pedestal 430 includes an alignment mounting feature 434 configured to support a portion of the light 404. The alignment mounting feature 434 may include an opening 436, such as a threaded opening, for receiving a fastener to secure the light 404 to the alignment mounting feature 434. In an example, the alignment mounting feature 434 is provided at the distal end 432. The alignment mounting feature 434 defines an attachment point for the light 404. In various embodiments, the alignment mounting feature 434 is defined by a planar surface at the distal end 432. The planar surface may be parallel to the plate 410. Alternatively, the planar surface may be angled nonparallel to the plate 410. For example, the planar surface may be tilted side-to-side and/or tilted end-to-end. The angle of the alignment mounting feature 434 relative to the plate 410 controls an orientation of the light 404 relative to the plate 410. For example, the light 404 may be held parallel to the plate 410 or may be held nonparallel to the plate 410 depending upon the angle of the alignment mounting feature 434. As such, the alignment mounting feature 434 controls the lighting effect of the light 404, such as the lighting angle.

In an exemplary embodiment, the positions and orientations of the light mount pedestals 430 relative to each other are maintained by the plate 410. The plate 410 spaces the light mount pedestals 430 at predetermined spacing to support the light 404 along the length of the light 404. Heights of the light mount pedestals 430 are selected to control the vertical spacing of the light 404 relative to the plate 410. In various embodiments, heights of the light mount pedestals 430 may be different from each other, such as to offset the alignment mounting features 434 at different heights relative to the plate 410. Angles of the alignment mounting features 434 are selected to control the tilted angular orientation of the light 404 relative to the plate 410. In various embodiments, the tilt angle of one or more of the alignment mounting features 434 may be different than tilt angles of at least one other alignment mounting feature 434.

The alignment mounting features 434 are positioned relative to each other to define a longitudinal mounting axis 438. In various embodiments, side-to-side positioning of the light mount pedestals 430 may be selected to control the orientation of the longitudinal mounting axis 438 relative to the longitudinal plate axis 415 and thus control the position of the light 404 relative to the plate 410. In various embodiments, the light mount pedestals 430 may be aligned with each other such that the longitudinal mounting axis 438 is parallel to the longitudinal plate axis 415 and thus orient the light 404 parallel to the plate 410. In alternative embodiments, the light mount pedestals 430 may be offset from each other such that the longitudinal mounting axis 438 is nonparallel to the longitudinal plate axis 415 and thus orient the light 404 non-parallel to the plate 410.

The chassis 402 includes a plurality of wire standoffs 440 extending from the upper surface 412 of the plate 410. The wire standoffs 440 are used to position the wire(s) 406 (shown in FIGS. 5 and 6) relative to the plate 410. In various embodiments, the wire standoffs 440 are separate and discrete from the plate 410 and secured to the plate, such as using fasteners. In alternative embodiments, the wire standoffs 440 are integral with the plate 410. In an example, the wire standoffs 440 are located proximate to the first end 416. The wire standoffs 440 are spaced apart from each other along the length of the plate 410. The wire standoffs 440 are located at designated locations for routing the wires 406 along a designated path along the plate 410.

In an example, each wire standoffs 440 includes a post 442 and a hub 444 extending from the posts 442. The post 442 extends from the upper surface 412 of the plate 410. The hub 444 is located at or near a distal end of the posts 442. The hub 444 is spaced apart from the plate 410 to form a space 446 between the hub 444 and the plate 410. The space 446 may receive a portion of the wire 406. In an exemplary embodiment, the hub 444 includes openings 448 for receiving securing means, such as cable ties, clips, or other securing means to secure the wire 406 to the wire standoffs 440.

The chassis 402 includes one or more wire disconnect mounting brackets 450. The wire disconnect mounting brackets 450 are used to mount a wire disconnect at the end of the wire 406 to the plate 410 at a designated area. In an exemplary embodiment, the wire disconnect mounting bracket 450 includes a pad 452 having a plurality of openings 454. The openings 454 receive fasteners, such as threaded fasteners, rivets, snap-in barbs, and the like, to secure the wire disconnect to the wire disconnect mounting bracket 450.

The chassis 402 includes wire guide bosses 460 extending from the upper surface 412 of the plate 410. The wire guide bosses 460 are used to support a wire guide, which is used to route the wire 406 along the chassis 402. In an example, the wire guide bosses 460 are integral with the plate 410. Alternatively, the wire guide bosses 460 may be separate and discrete from the plate 410 and coupled to the plate, such as using fasteners. In an example, the wire guide bosses 460 are located proximate to the second end 418; however, other locations are possible in alternative embodiments. The wire guide bosses 460 are used to elevate the wire guide off of the plate 410.

The chassis 402 includes a plurality of valance supports 468 used to support the valance 180 (shown in FIG. 4). In the illustrated embodiment, each valance support 468 includes a valance mount pedestal 470 and a valance latch 480 (shown in FIG. 8) configured to be mounted to the valance mount pedestal 470. Other types of support features may be used in alternative embodiments for supporting the valance 180.

The valance mount pedestals 470 extend from the upper surface 412 of the plate 410. In an exemplary embodiment, the valance mount pedestals 470 are integral with the plate 410. For example, the valance mount pedestals 470 may be diecast with the plate 410 or machined from the metal block with the plate 410. In other examples, the valance mount pedestals 470 are separate and discrete from the plate 410 and coupled to the plate 410, such as using fasteners. The valance mount pedestals 470 are spaced apart along the plate 410. The plate 410 maintains relative spacing of the valance mount pedestals 470. In various embodiments, the valance mount pedestals 470 may be located at the second side 422 (for example, the rear side); however, other locations are possible in alternative embodiments.

Each valance mount pedestal 470 extends from the plate 410 to a distal end 472. The valance mount pedestal 470 includes an alignment mounting feature 474 configured to support the corresponding valance latch 480. The alignment mounting feature 474 may include openings 476, such as a threaded openings, for receiving fasteners to secure the valance latch 480 to the alignment mounting feature 474. In an example, the alignment mounting feature 474 is provided at the distal end 472. The alignment mounting feature 474 defines an attachment point for the valance latch 480. In various embodiments, the alignment mounting feature 474 is defined by a planar surface at the distal end 472. The planar surface may be parallel to the plate 410. Alternatively, the planar surface may be angled nonparallel to the plate 410. For example, the planar surface may be tilted side-to-side and/or tilted end-to-end. The angle of the alignment mounting feature 474 relative to the plate 410 controls an orientation of the valance latch 480, and thus the valance 180, relative to the plate 410. For example, the valance 180 may be held parallel to the plate 410 or may be held nonparallel to the plate 410 depending upon the angle of the alignment mounting feature 474.

In an exemplary embodiment, the positions and orientations of the valance mount pedestals 470 relative to each other are maintained by the plate 410. The plate 410 spaces the valance mount pedestals 470 at predetermined spacing to support the valance 180 along the length of the valance 180. Heights of the valance mount pedestals 470 are selected to control the vertical spacings of the valance latches 480 relative to the plate 410. In various embodiments, heights of the valance mount pedestals 470 may be different from each other, such as to offset the alignment mounting features 474 at different heights relative to the plate 410. Angles of the alignment mounting features 474 are selected to control the tilted angular orientation of the valance latches 480 relative to the plate 410. In various embodiments, the tilt angle of one or more of the alignment mounting features 474 may be different than tilt angles of at least one other alignment mounting feature 474.

The alignment mounting features 474 are positioned relative to each other to define a longitudinal mounting axis 478. In various embodiments, side-to-side positioning of the valance mount pedestals 470 may be selected to control the orientation of the longitudinal mounting axis 478 relative to the longitudinal plate axis 415 and thus control the position of the valance 180 relative to the plate 410. In various embodiments, the valance mount pedestals 470 may be aligned with each other such that the longitudinal mounting axis 478 is parallel to the longitudinal plate axis 415 and thus orient the valance 180 parallel to the plate 410. In alternative embodiments, the valance mount pedestals 470 may be offset from each other such that the longitudinal mounting axis 478 is nonparallel to the longitudinal plate axis 415 and thus orient the valance 180 non-parallel to the plate 410.

Figure 8:
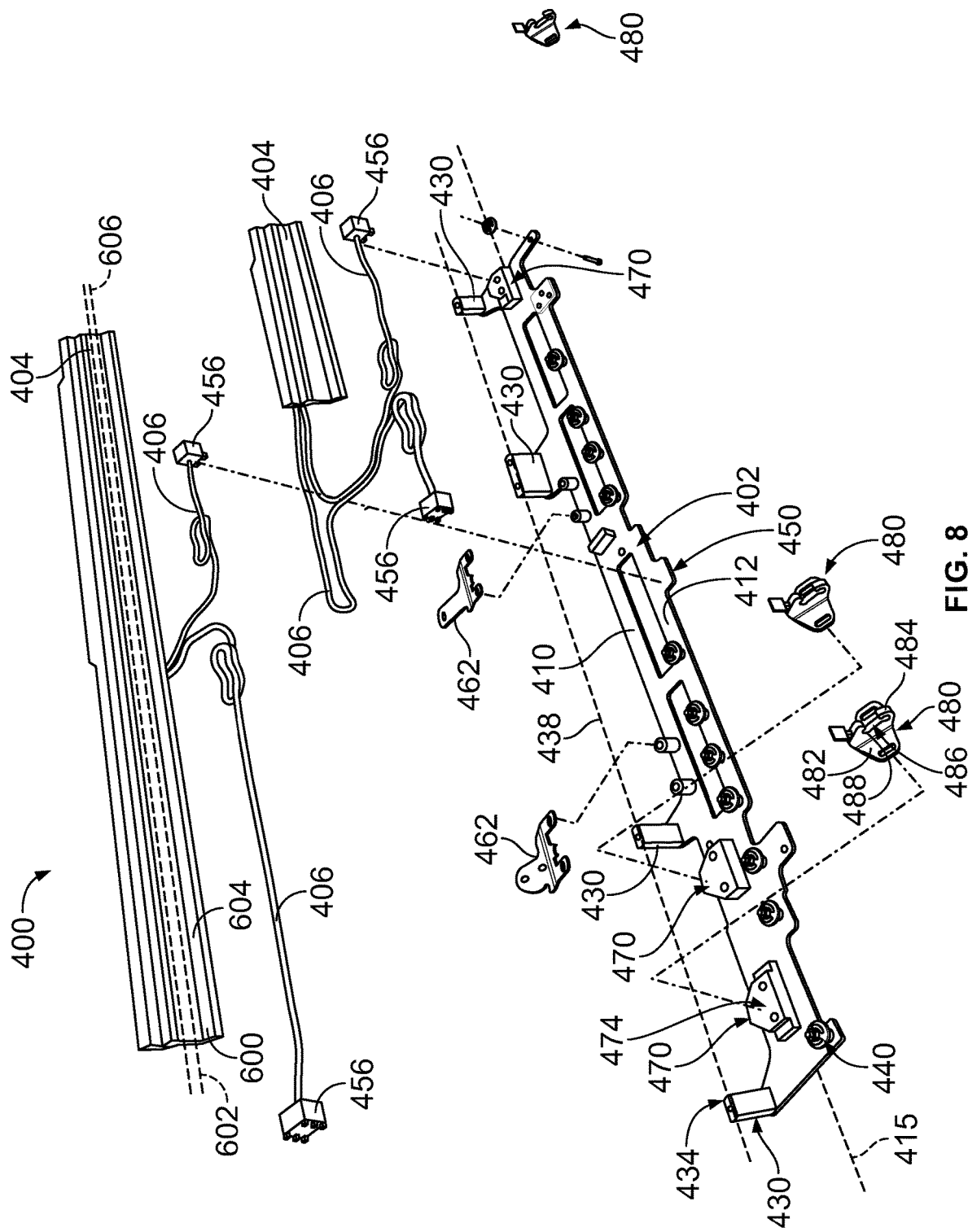
FIG. 8 is an exploded view of the upper light assembly in accordance with an exemplary embodiment.

FIG. 8 is an exploded view of the upper light assembly 400 in accordance with an exemplary embodiment. The upper light assembly 400 includes the upper chassis 402, the upper lights 404, the upper wires 406, the valance latches 480, and one or more wire guides 462. The upper chassis 402 combines many structures into an integral, unitary structure, which reduces part count and reduces the number of components that need to be mounted into the stowage bin assembly 140, which reduces assembly labor time. The upper chassis 402 precisely controls the positions of the upper lights 404 and the upper wires 406 for ease of installation and assembly to the stowage bin assembly 140. The components of the upper light assembly 400 are configured to be assembled into an assembled unit prior to mounting to the stowage bin assembly 140. For example, the upper light assembly 400 may be pre-assembled outside of the aircraft 110, such as on an assembly bench, where the components are easily accessible for proper and quick assembly. The assembled unit may be inspected outside of the aircraft prior to mounting to the stowage bin assembly 140, such as to ensure that the lights 404 are properly mounted to the chassis 402 and the wires 406 are properly routed and secured to the chassis 402. The pre-assembly and work performed outside of the aircraft eliminates the need for an electrician working in the tight spaces in the aircraft and occupying the aisle inside the aircraft for long periods of time, reducing downtime of the aircraft for installation and repair.

During assembly, the valance latches 480 are secured to the valance mount pedestals 470, such as using fasteners. In an example, each valance latch 480 includes a base 482 configured to be mounted to the valance mount pedestal 470 and a latching element 484 extending from the base 482. The latching element 484 includes a slot 486 and a latching finger 488 configured to engage the valance 180 to latchably secure the valance 180 to the upper light assembly 400. Other types of latching elements may be used in alternative embodiments. The position and the orientation of the valance latch 480 is controlled by the valance mount pedestal 470. For example, the location of the valance mount pedestal 470 along the plate 410 and the angle of the alignment mounting feature 474 controls the position and the orientation of the valance latch 480.

In an example, the upper light assembly 400 includes multiple lights 404, such as a first light 404a and a second light 404b. Each light 404 includes a housing 600 holding a lighting element or lamp 602 and a lens 604. In an example, the lighting element 602 is an LED; however, other types of lighting elements may be used in other embodiments, such as fluorescent tubes. The lens 604 is located at the front of the light 404 and controls the lighting effect. The light from the lighting element 602 is emitted through the lens 604. The light 404 extends along a longitudinal light axis 606.

The lights 404 are mounted to the corresponding light mount pedestals 430 of the chassis 402. In an exemplary embodiment, each light 404 is supported by a plurality of the light mount pedestals 430. For example, the light mount pedestals 430 may be provided proximate to the ends of the light 404 and/or along other portions of the light 404, such as a central portion of the light 404. Optionally, one of the light mount pedestals 430 may be a dual pedestal configured to support the ends of two of the lights 404. For example, the dual pedestal may have a greater width than other light mount pedestals 430. The housing 600 of the light 404 is mounted to the alignment mounting features 434 of the light mount pedestals 430, such as using fasteners. The chassis 402 defines an intermediary structure between the lights 404 and the stowage bin assembly 140. The light mount pedestals 430 are not directly mounted to the stowage bin assembly 140, but rather are part of the chassis 402 and are thus installed onto the stowage bin assembly 140 via the chassis 402. The chassis 402 defines an intermediary structure between the wires 406 and the stowage bin assembly 140. The wire standoffs 440 are not directly mounted to the stowage bin assembly 140, but rather are part of the chassis 402 and are thus installed onto the stowage bin assembly 140 via the chassis 402.

The alignment mounting features 434 controls the position and orientation of the light 404 relative to the chassis 402. The alignment mounting features 434 may be offset relative to each other and relative to the longitudinal fuselage axis 224 (shown in FIG. 2A) of the aircraft. The alignment mounting features 434 of the light mount pedestals 430 define the longitudinal mounting axis 438. The longitudinal mounting axis 438 may be tapered transversely relative to the longitudinal fuselage axis 224, such as to follow any curvature or tapering of the fuselage. The light 404 is held along the longitudinal mounting axis 438. Each alignment mounting feature 434 may have a height that is different from a height of at least one other alignment mounting feature 434 to vertically taper the longitudinal mounting axis 438 relative to the longitudinal fuselage axis 224. Each alignment mounting feature 434 may include an angled mounting surface formed at an angle relative to the upper surface 412 of the plate 410. The angled mounting surface may be formed at a different angle relative to at least one other angled mounting surface. All the angled mounting surfaces define the longitudinal mounting axis 438. In various examples, the light mount pedestals 430 have different heights to locate the light 404 at different distances from an upper surface 412 of the plate 410.

In an example, the pair of lights 404 are located adjacent each other such that the light axes 606 are congruent. The light axes 606 may be parallel to the longitudinal plate axis 415. In another example, the light axes 606 may be oriented transverse to the longitudinal plate axis 415 (for example, tilted inward or outward and/or tilted upward or downward).

The wires 406 are electrically connected to the light 404 for powering the lighting element 602. The wires 406 may be terminated directly to the lighting element 602. In other various embodiments, a wiring pig tail or jumper bundle may extend from the lighting element 602 and the wires 406 are terminated to the wiring pig tail or jumper bundle. In other various embodiments, electrical connectors may be provided at ends of the wires 406 for connection to mating electrical connectors associated with the lighting element 602. The wires 406 may transmit power and/or data to/from the lighting element 602. In an exemplary embodiment, the wires 406 extend from the light 404 and are guided into position on the plate 410 by the wire guides 462. The wire guides 462 may provide strain relief for the wires 406 to prevent damage to the wires 406 or the light 404. The wires 406 extend from the light 404 and are configured to be coupled to corresponding wire standoffs 440. For example, the wires 406 may be secured to the wire standoffs 440 using cable ties or other securing elements. In various embodiments, the wires 406 may be wrapped or coiled around the wire standoffs 440, such as at least two of the wire standoffs 440, to take up slack in the wires 406 and properly position the wires 406 relative to the plate 410. The wire standoffs 440 may be sized and shaped to control bending of the wires 406, such as to limit stress in the wires 406 and maintain a minimum bending radius for the wires 406.

In an exemplary embodiment, the multiple wires 406 include an upstream wire 406a and a downstream wire 406b. The upstream wire 406a is configured to be electrically connected to an upstream light 404. The downstream wire 406b is configured to be electrically connected to a downstream light 404. Power is supplied between the lights 404 through the wires 406. In an exemplary embodiment, a wire disconnect 456 is provided at the end of the wire 406. The wire disconnect 456 is an electrical connector, such as a plug connector or a receptacle connector. The wire disconnect 456 may include a connector housing and one or more contacts held in the connector housing. The wire disconnect 456 is configured to be electrically connected to an upstream or downstream wire disconnect. In an exemplary embodiment, the wire disconnect 456 is coupled to the chassis 402 at the wire disconnect mounting bracket 450.

Figure 9:
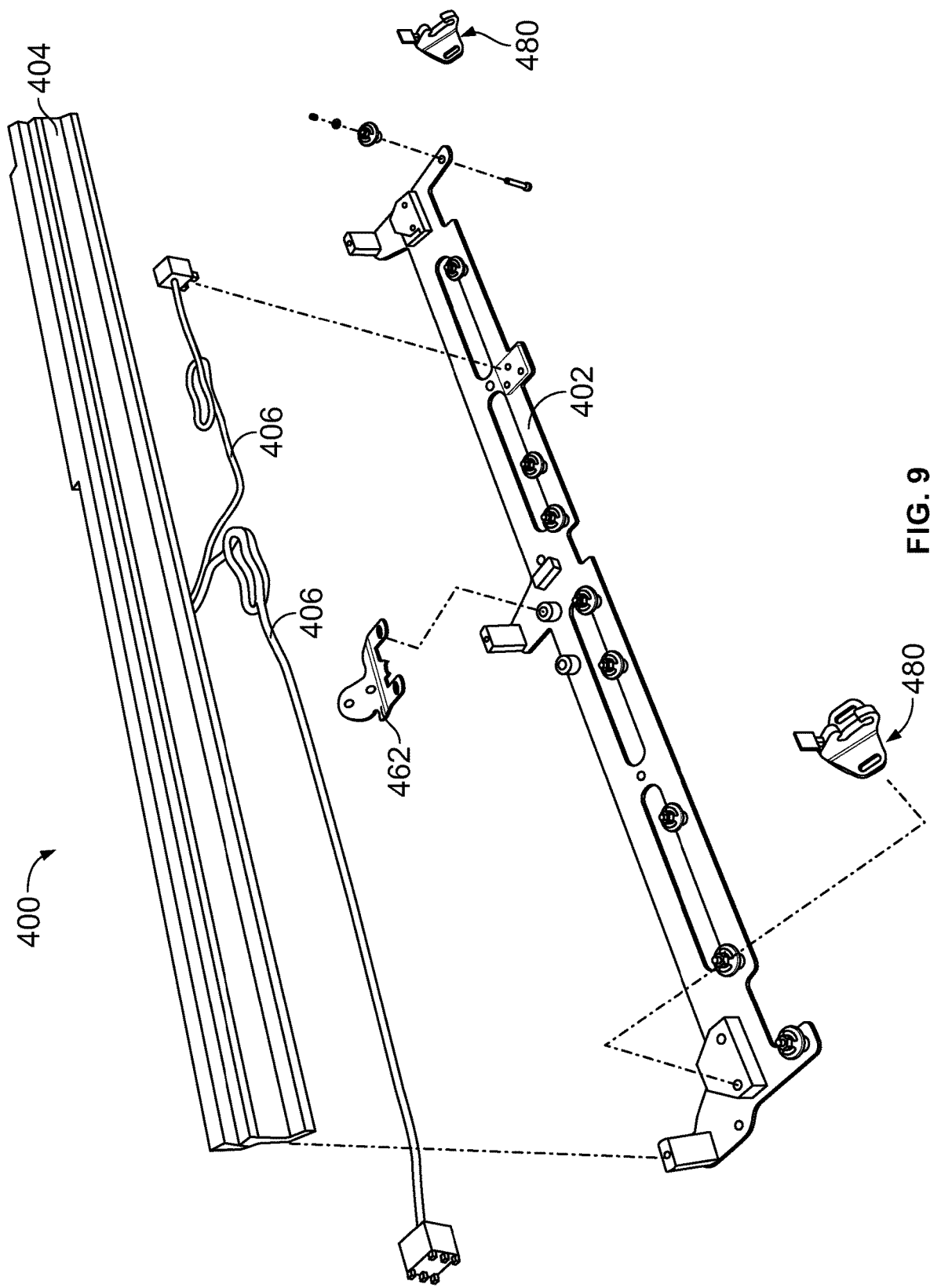
FIG. 9 is an exploded view of the upper light assembly in accordance with an exemplary embodiment.

FIG. 9 is an exploded view of the upper light assembly 400 in accordance with an exemplary embodiment. In the illustrated embodiment, the upper light assembly 400 includes a single upper light 404. The upper chassis 402 is sized and shaped to accommodate the single light 404 rather than supporting multiple lights 404. The upper light assembly 400 includes the upper chassis 402, the upper light 404, the upper wires 406, the valance latches 480, and one or more wire guides 462. The components of the upper light assembly 400 are configured to be assembled into an assembled unit prior to mounting to the stowage bin assembly 140.

Figure 10:
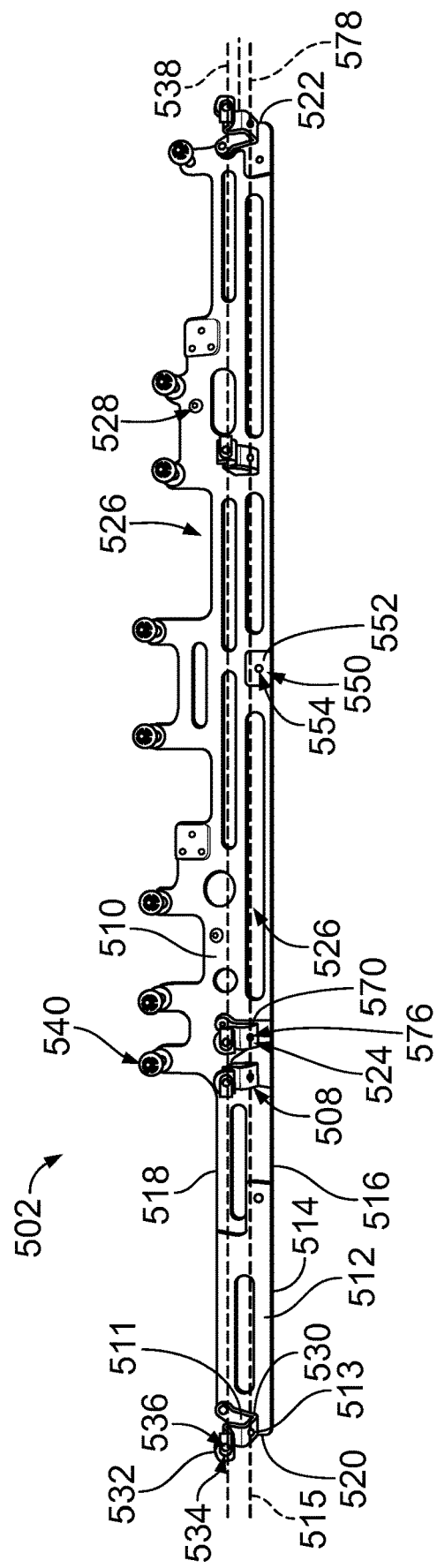
FIG. 10 is a top perspective view of the lower chassis in accordance with an exemplary embodiment.

FIG. 10 is a top perspective view of the lower chassis 502 in accordance with an exemplary embodiment. The chassis 502 includes a lower plate 510 configured to be mounted to the stowage bin assembly 140 (shown in FIG. 5) and configured to support the components of the lower light assembly 500. For example, the plate 510 includes an upper surface 512 for supporting the components and a lower surface 514 configured to be mounted directly to the stowage bin assembly 140. With reference back to FIG. 5, the lower light assembly 500 may be mounted at a different location along the upper surface of the stowage bin assembly 140 than the upper light assembly 400.

In an exemplary embodiment, the plate 510 is manufactured to have specific dimensions and features for supporting and precisely positioning the components of the lower light assembly 500 relative to each other and relative to the stowage bin assembly 140. In various embodiments, the plate 510 is generally planar and extends along a longitudinal plate axis 515 between a first end 516 and a second end 518. The plate 510 has a first side 520 and a second side 522. The first side 520 may define a front side and the second side 522 may define a rear side of the plate 510. In various embodiments, the plate 510 may include one or more steps (not shown) to change an elevation of the plate 510 along the length of the plate 510. The plate 510 includes cutouts 526 through the plate 510, such as to reduce weight of the plate 510 or to accommodate features of the stowage bin assembly 140. The plate 510 includes mounting openings 528 that receive fasteners (not shown) for securing the plate 510 to the stowage bin assembly 140.

In an exemplary embodiment, the chassis 502 includes support fittings 508 extending from the upper surface 512 of the plate 510. In an embodiment, the support fittings 508 are separate and discrete from the plate 510 and configured to be coupled thereto. For example, the support fittings 508 may be stamped and formed structures secured to the plate 510 using fasteners or other securing means. In the illustrated embodiment, each support fitting 508 is L-shaped having a base 511 mounted to the plate 510 and an upstanding leg 513 extending from the base 511. The support fitting 508 may have other shapes in alternative embodiments. In an exemplary embodiment, the support fitting 508 defines a light mount pedestal 530 for supporting the lights 504 (shown in FIGS. 5 and 6) and a valance mount pedestal 570 for supporting the valance 180 (shown in FIG. 4). The lights 504 and the valance 180 may be mounted to different portions of the support fitting 508.

The chassis 502 includes a plurality of the light mount pedestals 530 extending from the upper surface 512 of the plate 510. The light mount pedestals 530 are used to support the light 504 of the lower light assembly 500. The light mount pedestals 530 are spaced apart along the plate 510. The plate 510 maintains relative spacing of the light mount pedestals 530. In various embodiments, the light mount pedestals 530 may be located at the first side 520 (for example, the front side); however, other locations are possible in alternative embodiments.

Each light mount pedestal 530 includes an alignment mounting feature 534 configured to support a portion of the light 504. The alignment mounting feature 534 may include an opening 536, such as a threaded opening, for receiving a fastener to secure the light 504 to the alignment mounting feature 534. In an example, the alignment mounting feature 534 is provided at a front surface of the leg 513 of the support fitting 508. The alignment mounting feature 534 defines an attachment point for the light 504. In various embodiments, the alignment mounting feature 534 is defined by a planar surface at the distal end 532. The planar surface may be oriented vertically, such as perpendicular to the plate 510. Alternatively, the planar surface may be angled transverse to the plate 510. The angle of the alignment mounting feature 534 relative to the plate 510 controls an orientation of the light 504 relative to the plate 510.

In an exemplary embodiment, the positions and orientations of the light mount pedestals 530 relative to each other are maintained by the plate 510. The plate 510 spaces the light mount pedestals 530 at predetermined spacing to support the light 504 along the length of the light 504. Heights of the light mount pedestals 530 are selected to control the vertical spacing of the light 504 relative to the plate 510. In various embodiments, heights of the light mount pedestals 530 may be different from each other, such as to offset the alignment mounting features 534 at different heights relative to the plate 510. In alternative embodiments, pads or shims at the plate 510 may have different thicknesses to position the support fittings 508 at different heights, and thus mount the light 504 at an angle relative to the plate 510. Angles of the alignment mounting features 534 are selected to control the tilted angular orientation of the light 504 relative to the plate 510. In various embodiments, the tilt angle of one or more of the alignment mounting features 534 may be different than tilt angles of at least one other alignment mounting feature 534.

The alignment mounting features 534 are positioned relative to each other to define a longitudinal mounting axis 538. In various embodiments, vertical positioning and/or side-to-side positioning of the light mount pedestals 530 may be selected to control the orientation of the longitudinal mounting axis 538 relative to the longitudinal plate axis 515 and thus control the orientation of the light 504 relative to the plate 510. In various embodiments, the light mount pedestals 530 may be aligned with each other such that the longitudinal mounting axis 538 is parallel to the longitudinal plate axis 515 and thus orient the light 504 parallel to the plate 510. In alternative embodiments, the light mount pedestals 530 may be offset from each other such that the longitudinal mounting axis 538 is nonparallel to the longitudinal plate axis 515 and thus orient the light 504 nonparallel to the plate 510.

The chassis 502 includes a plurality of wire standoffs 540 extending from the upper surface 512 of the plate 510. The wire standoffs 540 are used to position the wire(s) 506 (shown in FIGS. 5 and 6) relative to the plate 510. In various embodiments, the wire standoffs 540 are separate and discrete from the plate 510 and secured to the plate, such as using fasteners. In alternative embodiments, the wire standoffs 540 are integral with the plate 510. In an example, the wire standoffs 540 are located proximate to the first end 516. The wire standoffs 540 are spaced apart from each other along the length of the plate 510. The wire standoffs 540 are located at designated locations for routing the wires 506 along a designated path along the plate 510.

The chassis 502 includes one or more wire disconnect mounting brackets 550. The wire disconnect mounting brackets 550 are used to mount a wire disconnect at the end of the wire 506 to the plate 510 at a designated area. In an exemplary embodiment, the wire disconnect mounting bracket 550 includes a pad 552 having a plurality of openings 554. The openings 554 receive fasteners, such as threaded fasteners, rivets, snap-in barbs, and the like, to secure the wire disconnect to the wire disconnect mounting bracket 550.

The chassis 502 includes a plurality of valance supports defined by the valance mount pedestals 570 of the support fitting 508. Other types of support features may be used in alternative embodiments for supporting the valance 180. The valance mount pedestals 570 extend from the upper surface 512 of the plate 510. The valance mount pedestals 570 are spaced apart along the plate 510. The plate 510 maintains relative spacing of the valance mount pedestals 570. In various embodiments, the valance mount pedestals 570 may be located at the first side 522 (for example, the front side); however, other locations are possible in alternative embodiments.

Each valance mount pedestal 570 includes an alignment mounting feature 574 configured to support the valance 180. The alignment mounting feature 574 may include openings 576, such as a threaded openings for receiving fasteners. In an example, the alignment mounting feature 574 is provided at a distal end of the support fitting 508. The alignment mounting feature 574 defines an attachment point for attaching the valance 180 to the chassis 502. In various embodiments, the alignment mounting feature 574 is defined by a planar surface. The planar surface may be parallel to the plate 510. Alternatively, the planar surface may be angled nonparallel to the plate 510. For example, the planar surface may be tilted side-to-side and/or tilted end-to-end. The angle of the alignment mounting feature 574 relative to the plate 510 controls an orientation of the attachment surface for the valance 180 relative to the plate 510. For example, the valance 180 may be held parallel to the plate 510 or may be held nonparallel to the plate 510 depending upon the angle of the alignment mounting feature 574.

In an exemplary embodiment, the positions and orientations of the valance mount pedestals 570 relative to each other are maintained by the plate 510. The plate 510 spaces the valance mount pedestals 570 at predetermined spacing to support the valance 180 along the length of the valance 180. Heights of the valance mount pedestals 570 are selected to control the vertical spacings of the valance latches 580 relative to the plate 510. In various embodiments, heights of the valance mount pedestals 570 may be different from each other, such as to offset the alignment mounting features 574 at different heights relative to the plate 510. In other embodiments, pads or shims may be provided at the plate 510 to control vertical positions or heights of the support fittings 508 relative to each other and position the valance mount pedestals 570 at different heights. Angles of the alignment mounting features 574 are selected to control the tilted angular orientation of the valance latches 580 relative to the plate 510. In various embodiments, the tilt angle of one or more of the alignment mounting features 574 may be different than tilt angles of at least one other alignment mounting feature 574.

The alignment mounting features 574 are positioned relative to each other to define a longitudinal mounting axis 578. In various embodiments, side-to-side positioning of the valance mount pedestals 570 may be selected to control the orientation of the longitudinal mounting axis 578 relative to the longitudinal plate axis 515 and thus control the position of the valance 180 relative to the plate 510. In various embodiments, the valance mount pedestals 570 may be aligned with each other such that the longitudinal mounting axis 578 is parallel to the longitudinal plate axis 515 and thus orient the valance 180 parallel to the plate 510. In alternative embodiments, the valance mount pedestals 570 may be offset from each other such that the longitudinal mounting axis 578 is nonparallel to the longitudinal plate axis 515 and thus orient the valance 180 non-parallel to the plate 510.

Figure 11:
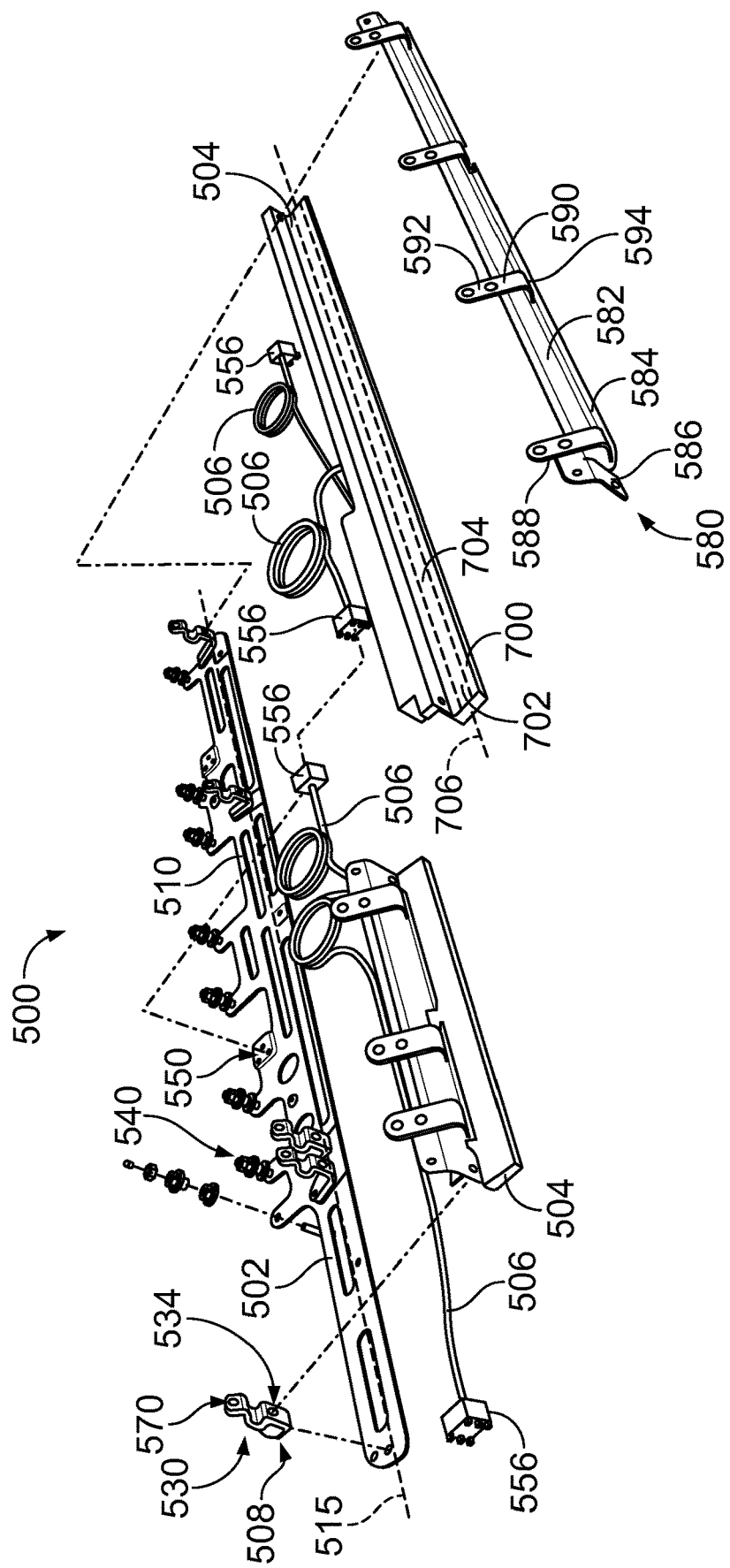
FIG. 11 is an exploded view of the lower light assembly in accordance with an exemplary embodiment.

FIG. 11 is an exploded view of the lower light assembly 500 in accordance with an exemplary embodiment. The lower light assembly 500 includes the lower chassis 502, one or more lower lights 504, the lower wires 506, and one or more valance supports 580 for supporting the valance 180. The components of the lower light assembly 500 are configured to be assembled into an assembled unit prior to mounting to the stowage bin assembly 140. For example, the lower light assembly 500 may be pre-assembled outside of the aircraft 110, such as on an assembly bench, where the components are easily accessible for proper and quick assembly. The assembled unit may be inspected outside of the aircraft 110 prior to mounting to the stowage bin assembly 140, such as to ensure that the light 504 is properly mounted to the chassis 502 and the wires 506 are properly routed and secured to the chassis 502.

The valance support 580 includes a rail 582 and a plurality of spring clips 590 coupled to the rail 582. The rail 582 extends longitudinally between opposite ends. The rail 582 includes a lip 584 at the bottom edge. The lip 584 is used to support the valance 180. The rail 582 includes rail mounting brackets 586 along the length of the rail 582, such as at the ends and along a central portion of the rail 582. The rail 582 includes clip mounting brackets 588 along the length of the rail 582.

The spring clips 590 are mounted to the clip mounting brackets 588 along the rail 582. Each spring clip 590 includes a mounting end 592 coupled to the clip mounting brackets 588 of the rail 582 and clip ends 594 opposite the mounting ends 592. The clip ends 594 face the lip 584. A portion of the valance 180 is configured to be received between the lip 584 of the rail 582 and the clip ends 594.

During assembly, the valance support 580 is configured to be secured to the valance mount pedestals 570, such as using fasteners. For example, the rail mounting brackets 586 are secured to the valance mount pedestals 570 using fasteners. In various embodiments, the rail 582 is coupled to the light 504 and both the rail 582 and the light 504 are coupled to the support fitting 508. The position and the orientation of the valance support 580 and the light 504 are controlled by the support fitting 508.

In an example, the lower light assembly 500 includes multiple lights 504, such as a first light 504*a* and a second light 504*b*. Each light 504 includes a housing 700 holding a lighting element or lamp 702 and a lens 704. In an example, the lighting element 702 is an LED; however, other types of lighting elements may be used in other embodiments, such as fluorescent tubes. The lens 704 is located at the front of the light 504 and controls the lighting effect. The light from the lighting element 702 is emitted through the lens 704. The light 504 extends along a longitudinal light axis 706.

The lights 504 are mounted to the corresponding light mount pedestals 530 of the chassis 502. In an exemplary embodiment, each light 504 is supported by a plurality of the light mount pedestals 530. For example, the light mount pedestals 530 may be provided proximate to the ends of the light 504 and/or along other portions of the light 504, such as a central portion of the light 504. The housing 700 of the light 504 is mounted to the alignment mounting features 534 of the light mount pedestals 530, such as using fasteners. The alignment mounting features 534 controls the position and orientation of the light 504 relative to the chassis 502. In an example, the pair of lights 504 are located adjacent each other such that the light axes 706 are congruent. The light axes 706 may be parallel to the longitudinal plate axis 515. In another example, the light axes 706 may be oriented transverse to the longitudinal plate axis 515 (for example, tilted inward or outward and/or tilted upward or downward).

The wires 506 are electrically connected to the light 504 for powering the lighting element 702. The wires 506 may be terminated directly to the lighting element 702. In other various embodiments, a wiring pig tail or jumper bundle may extend from the lighting element 702 and the wires 506 are terminated to the wiring pig tail or jumper bundle. In other various embodiments, electrical connectors may be provided at ends of the wires 506 for connection to mating electrical connectors associated with the lighting element 702. The wires 506 may transmit power and/or data to/from the lighting element 702. In an exemplary embodiment, the wires 506 extend from the light 504 and are configured to be coupled to corresponding wire standoffs 540. For example, the wires 506 may be secured to the wire standoffs 540 using cable ties or other securing elements. In various embodiments, the wires 506 may be wrapped or coiled around the wire standoffs 540 to take up slack in the wires 506 and properly position the wires 506 relative to the plate 510. The wire standoffs 540 may be sized and shaped to control bending of the wires 506, such as to limit stress in the wires 506 and maintain a minimum bending radius for the wires 506.

In an exemplary embodiment, the multiple wires 506 include an upstream wire 506*a* and a downstream wire 506*b*. The upstream wire 506*a* is configured to be electrically connected to an upstream light 504. The downstream wire 506*b* is configured to be electrically connected to a downstream light 504. Power and/or data is supplied between the lights 504 through the wires 506. In an exemplary embodiment, a wire disconnect 556 is provided at the end of the wire 506. The wire disconnect 556 is an electrical connector, such as a plug connector or a receptacle connector. The wire disconnect 556 may include a connector housing and one or more contacts held in the connector housing. The wire disconnect 556 is configured to be electrically connected to an upstream or downstream wire disconnect. In an exemplary embodiment, the wire disconnect 556 is coupled to the chassis 502 at the wire disconnect mounting bracket 550.

Figure 12:
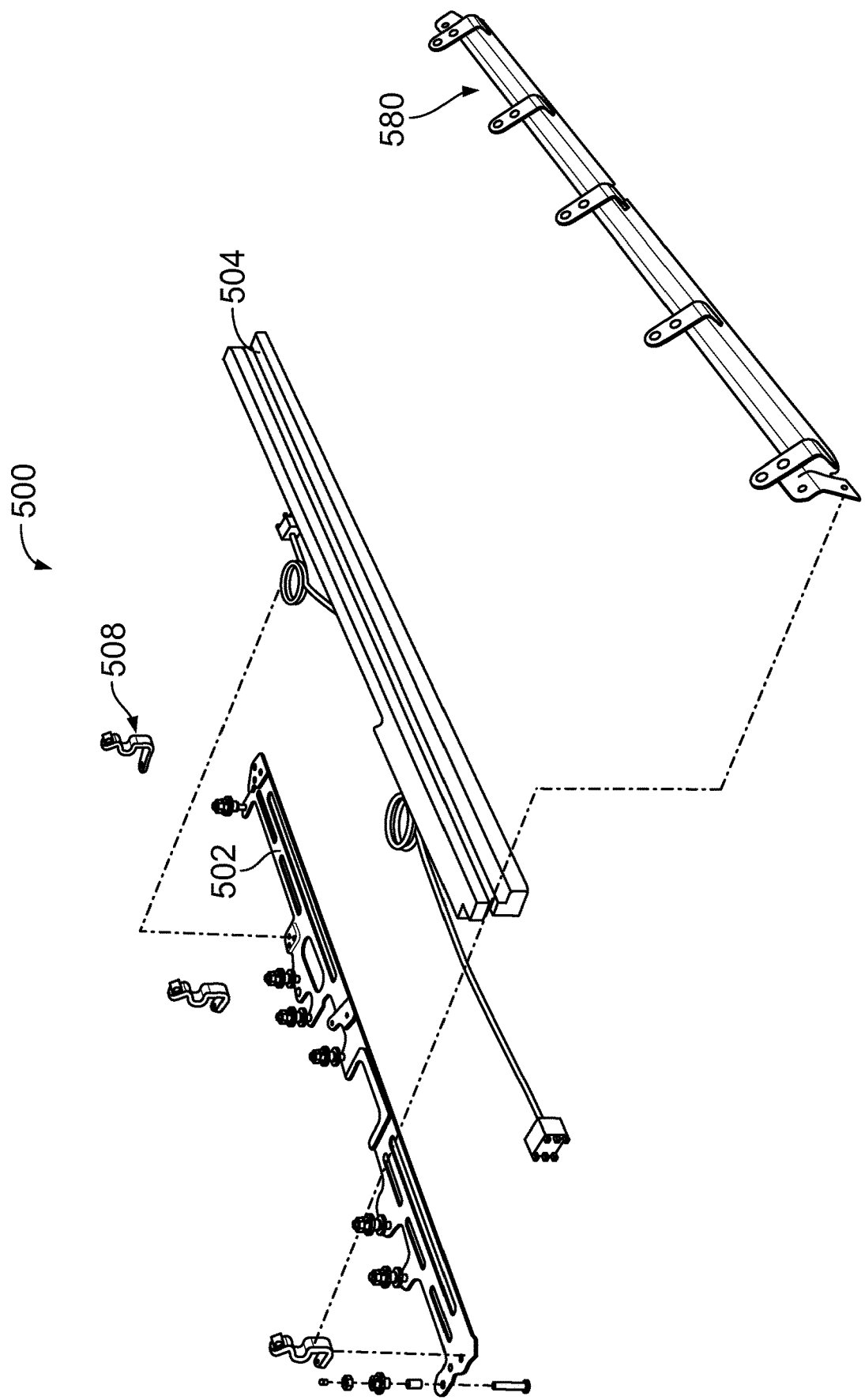
FIG. 12 is an exploded view of the lower light assembly in accordance with an exemplary embodiment.

FIG. 12 is an exploded view of the lower light assembly 500 in accordance with an exemplary embodiment. In the illustrated embodiment, the lower light assembly 500 includes a single lower light 504. The lower chassis 502 is sized and shaped to accommodate the single light 504 rather than supporting multiple lights 504. The lower light assembly 500 includes the lower chassis 502, the support fittings 508, the lower light 504, the lower wires 506, and the valance support 580. The components of the lower light assembly 500 are configured to be assembled into an assembled unit prior to mounting to the stowage bin assembly 140.

Figure 13:
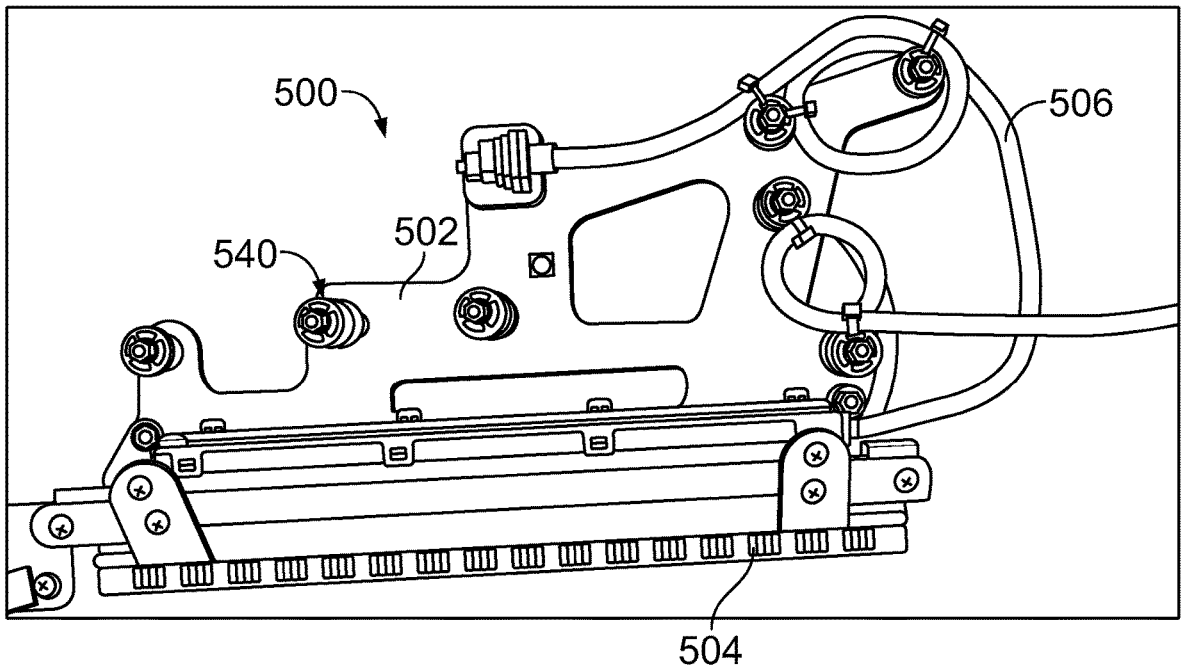
FIG. 13 is a top view of the lower light assembly in accordance with an exemplary embodiment

FIG. 13 is a top view of the lower light assembly 500 in accordance with an exemplary embodiment. In the illustrated embodiment, the lower chassis 502 is shaped differently than the embodiment shown in FIG. 12, such as being shorter and wider. The lower chassis 502 may be used on a different portion of the stowage bin assembly 140 (FIG. 4) or a stowage bin assembly having a different shape. The wire standoffs 540 are in different locations along the lower chassis 502 in the embodiment shown in FIG. 13 to control routing of the lower wires 506. The lower light assembly 500 includes a single lower light 504. The components of the lower light assembly 500 are configured to be assembled into an assembled unit prior to mounting to the stowage bin assembly 140.

Figure 14:
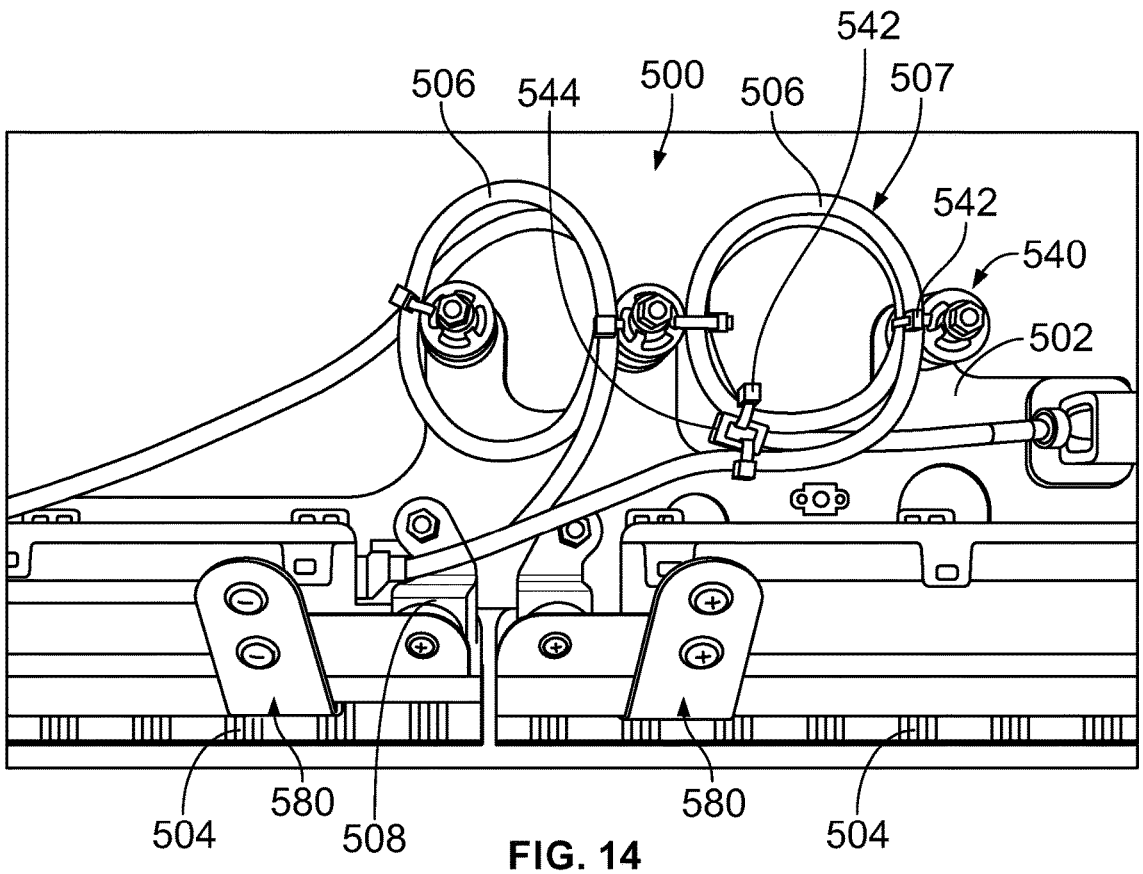
FIG. 14 is a top view of a portion of the lower light assembly shown in FIG. 11 in accordance with an exemplary embodiment.

FIG. 14 is a top view of a portion of the lower light assembly 500 shown in FIG. 11 in accordance with an exemplary embodiment. The lower chassis 502 supports the support fittings 508 and wire standoffs 540 at appropriate locations for supporting the lower lights 504, the lower wires 506, and the valance supports 580. The lower wires 506 are secured to the wire standoffs 540 using securing elements 542, such as cable ties. The lower wires 506 may be coiled into one or more wire coils 507, which may be secured to one or more of the wire standoffs 540. In various embodiments, tie blocks 544 are used to control wire routing. The securing elements 542 secure the lower wires 504 to the tie blocks 544. The components of the lower light assembly 500 are configured to be assembled into an assembled unit prior to mounting to the stowage bin assembly 140.

Figure 15:
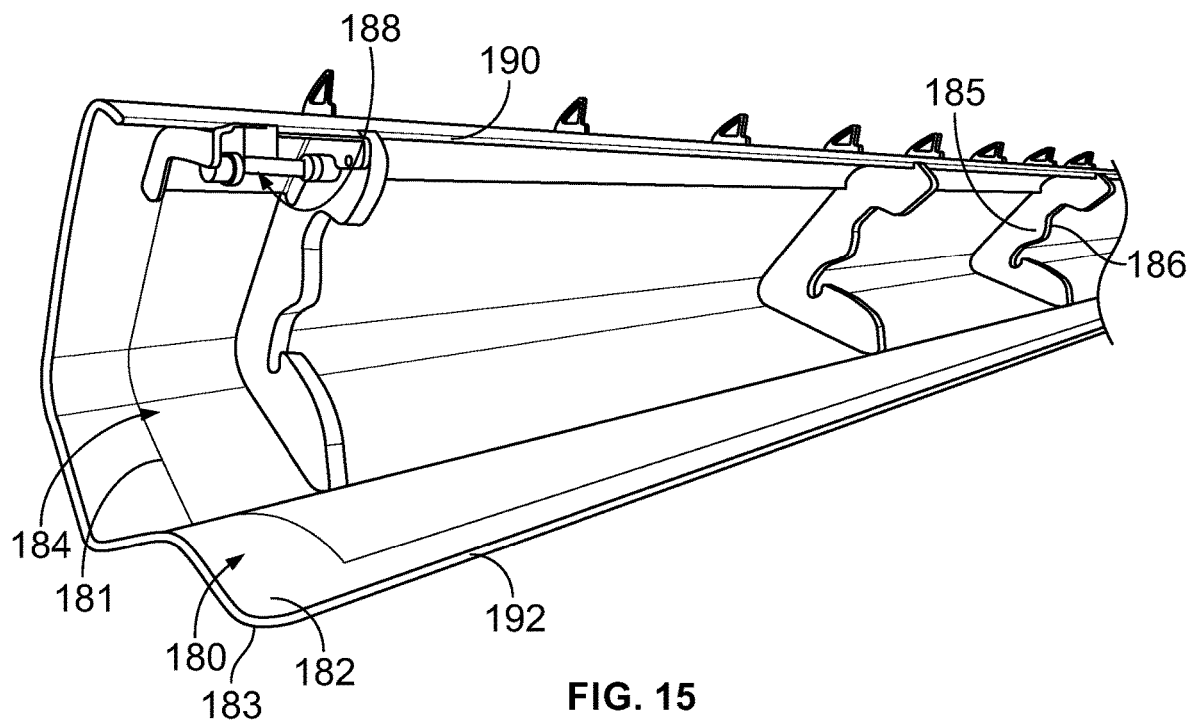
FIG. 15 is a perspective view of the valance in accordance with an exemplary embodiment.

FIG. 15 is a perspective view of the valance 180 in accordance with an exemplary embodiment. The valance 180 includes a valance panel 181 including an inner surface 182 and an outer surface 183. The inner surface 182 forms a valance pocket 184. The valance 180 includes an upper edge 190 and a lower edge 192. The valance pocket 184 is located between the upper edge 190 and the lower edge 192.

Figure 16:
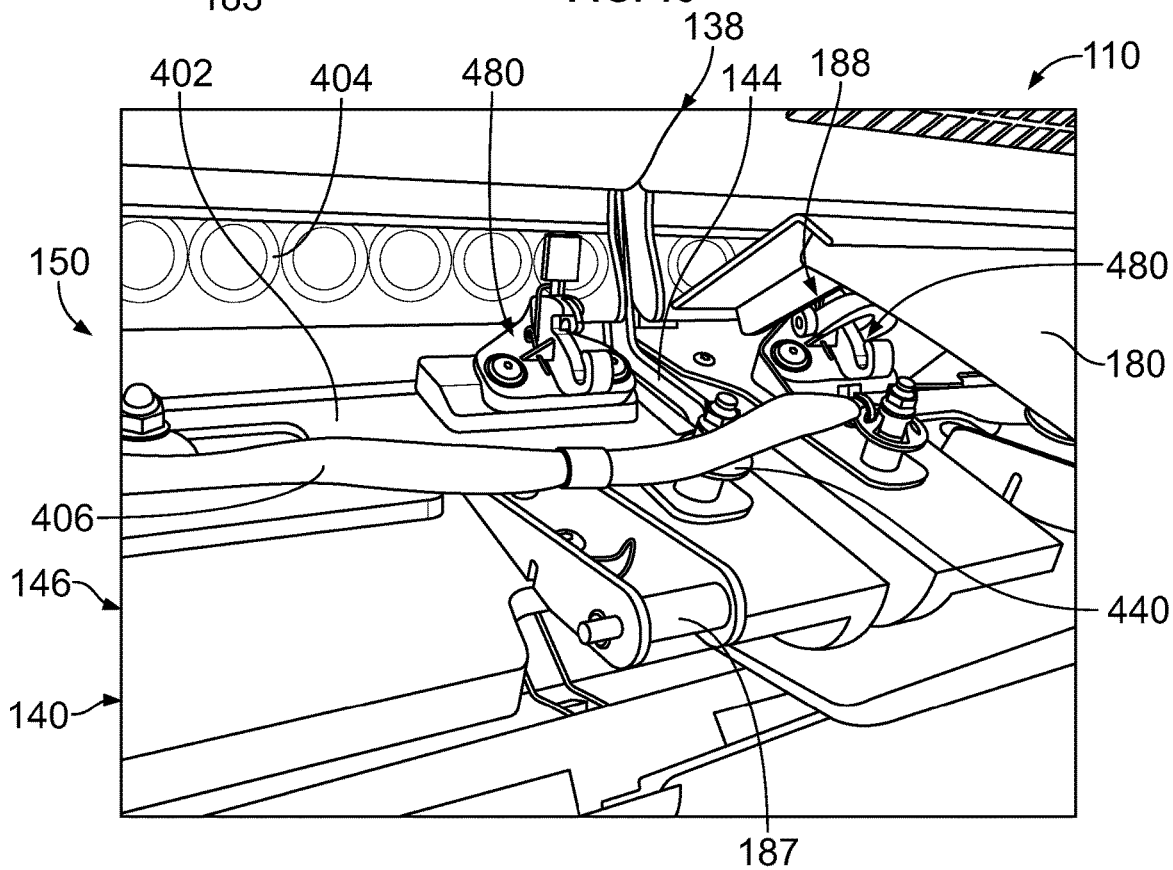
FIG. 16 is a perspective view of a portion of the aircraft showing stowage bin lighting assemblies coupled to corresponding stowage bin assemblies in accordance with an exemplary embodiment.

The valance 180 includes ribs 185 in the valance pocket 184 supporting the valance panel 181. The ribs 185 are spaced apart along the length of the valance panel 181. Each rib 185 includes a cam surface 186 configured to engage guide rollers 187 (shown in FIG. 16) to guide mating of the valance 180 with the stowage bin assembly 140. The ribs 185 fix the overall shape of the valence 180 throughout the length of the valence 180. The ribs 185 are spaced periodically along the valence 180 to provide the internal structure to the valence 180 to hold the shape. The shape between two different valences 180 is maintained to control fitting and alignment of the valances 180 placed next to each other in the airplane. The valance 180 includes latching elements 188 configured to be latchably coupled to the valance latches 480 (FIG. 16). The latching elements 188 may be located near the upper edge 190. In various embodiments, the latching element 188 may be a clip configured to be clipped into the valance latch 480.

FIG. 16 is a perspective view of a portion of the aircraft 110 showing stowage bin lighting assemblies 150 coupled to corresponding stowage bin assemblies 140 in accordance with an exemplary embodiment. A valance 180 is coupled to one of the stowage bin lighting assemblies 150 while the valance is removed from the other stowage bin lighting assembly 150 to illustrate the components of the stowage bin lighting assemblies 150. The stowage bin lighting assemblies 150 are pre-assembled outside of the aircraft 110, such as on an assembly bench, where the components are easily accessible for proper and quick assembly. The assembled units may be inspected outside of the aircraft 110 prior to mounting to the stowage bin lighting assemblies 150 to the upper portion 146 of the stowage bin assembly 140, such as to ensure that the lighting and wiring are properly mounted and routed prior to assembly to the stowage bin assembly 140.

A space 138 is provided between the stowage bin assemblies 140. Portions of the strongbacks 144 extend into the space 138 to support the stowage bin assemblies 140. In various embodiments, portions of the stowage bin lighting assemblies 150 may span across the space 138. For example, the wires 406 (and wires 506 not shown in FIG. 16) may span across the space 138. In various examples, the chassis 402 and the lights 404 may span across the space 138. The wire standoffs 440 provide anchoring points for the wires 406 to route the wires 406 relative to other structures, such as the strongbacks 144, the guide rollers 187, or other structures.

The stowage bin lighting assemblies 150 are mounted to the upper portion 146 to position the valance latches 480 for receiving the valance 180. During assembly of the valance 180, the lower portion of the valance 180 is coupled to the lower stowage bin lighting assembly 150 and the upper portion of the valance 180 is coupled to the upper stowage bin lighting assembly 150. The latching elements 188 are latchably coupled to the valance latches 480. In an exemplary embodiment, the valance 180 is configured for blind installation for ease of installation. For example, the lower portion of the valance 180 may be set into the lower stowage bin lighting assembly 150 and then the valance 180 may be pivoted in a mating direction to latchably couple the upper portion of the valance 180 to the upper stowage bin lighting assembly 150. In an exemplary embodiment, the valance 180 may be assembled without the use of tools.

Figure 17:
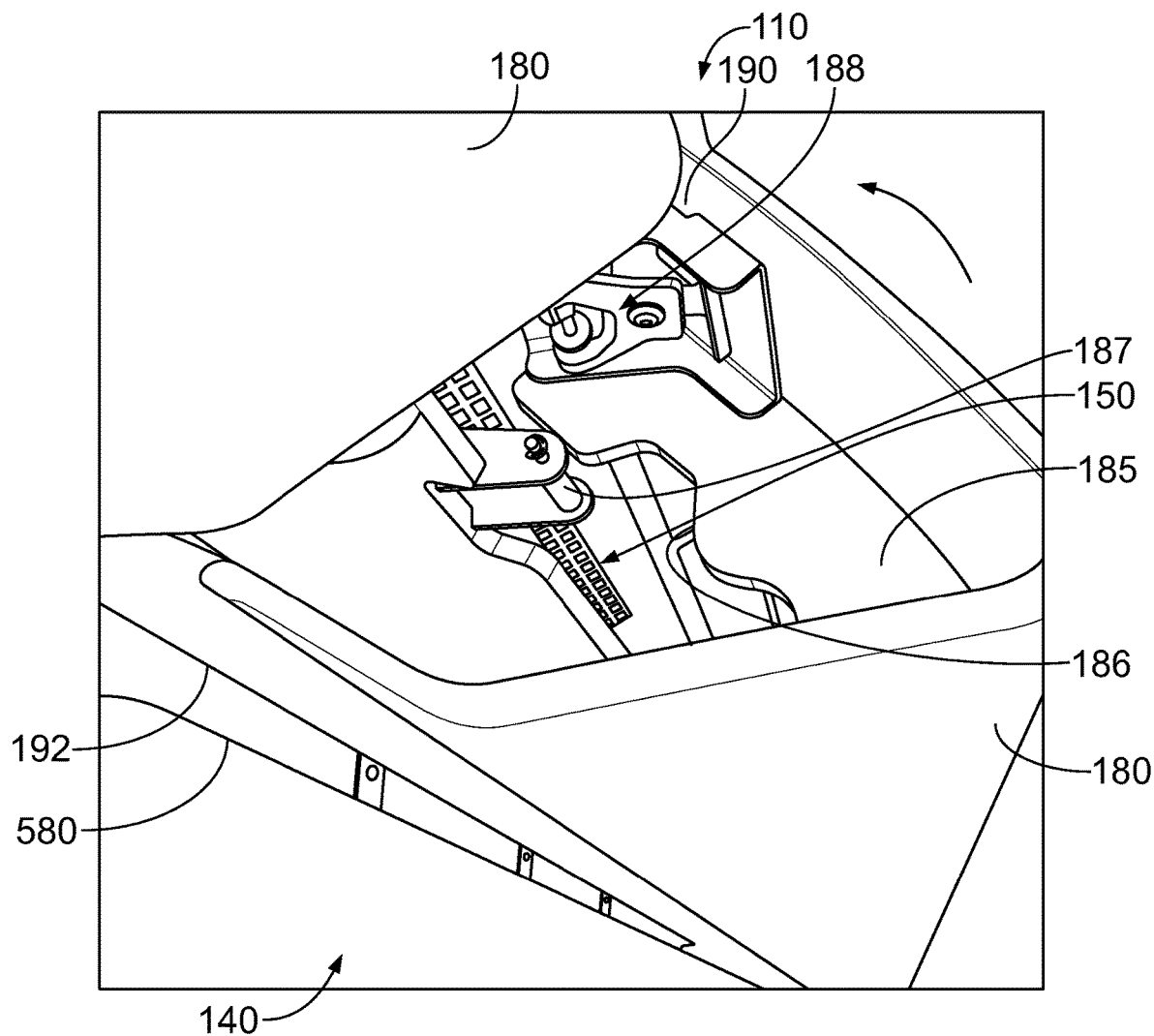
FIG. 17 is a perspective view of a portion of the aircraft showing one of the valances being coupled to the corresponding stowage bin assembly and stowage bin lighting assemblies in accordance with an exemplary embodiment.

FIG. 17 is a perspective view of a portion of the aircraft 110 showing one of the valances 180 being coupled to the corresponding stowage bin assembly 140 and stowage bin lighting assemblies 150 in accordance with an exemplary embodiment. In an exemplary embodiment, the valance 180 is configured for blind installation without the use of tools for ease of installation.

During assembly, the lower edge 192 of the valance 180 is coupled to the valance support 580 of the lower stowage bin lighting assembly 150. The valance 180 is then pivoted in a mating direction (shown by arrow) to latchably couple the latching element 188 at the upper edge 190 of the valance 180 to the valance latch 480 (FIG. 16) of the upper stowage bin lighting assembly 150. The guide roller 187 is used to guide mating of the latching element 188 with the valance latch 480. For example, the cam surface 186 is formed in the rib 185 to engage guide roller 187 and guide the latching element 188 into latching engagement with the valance latch 480.

Figure 18:
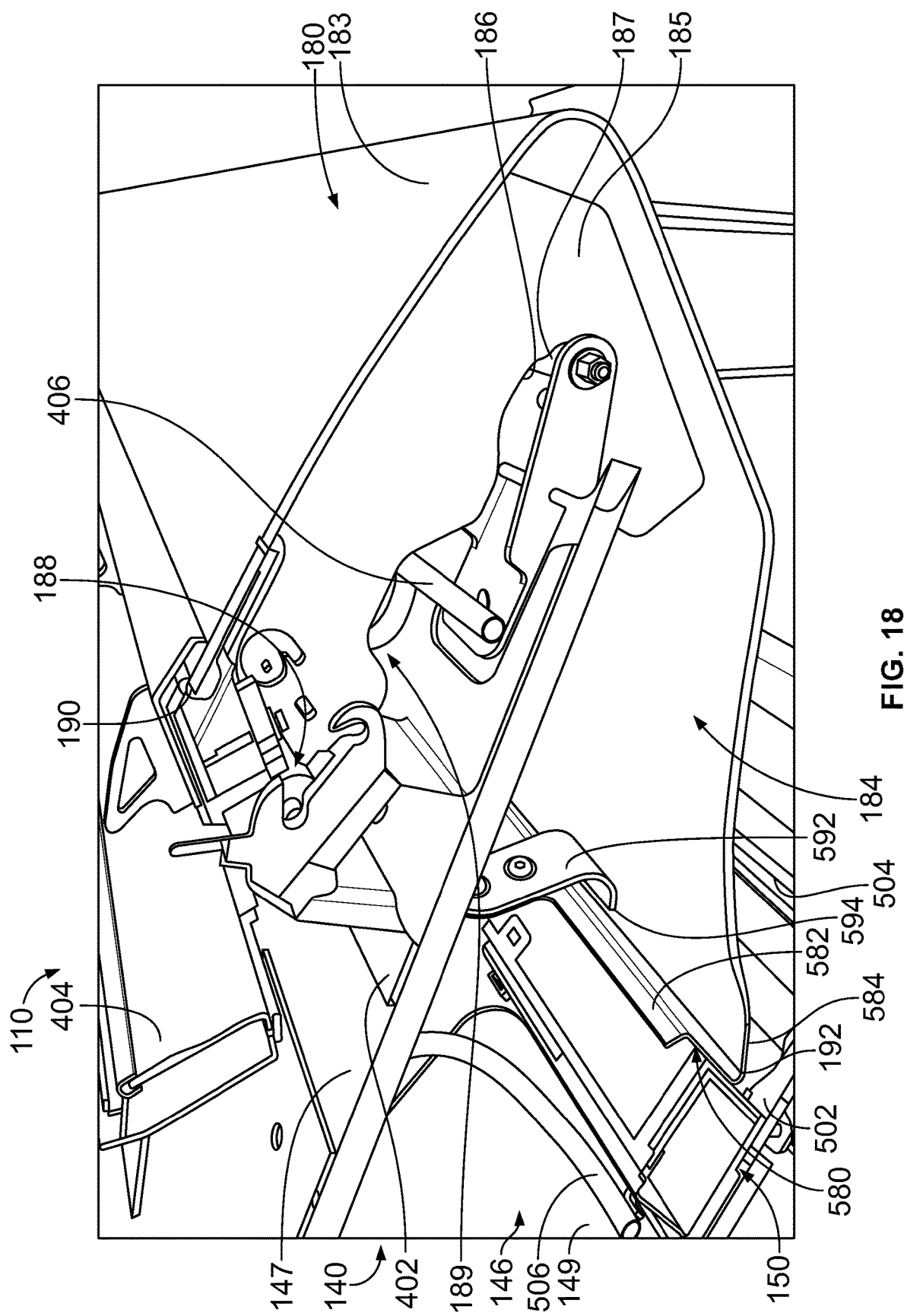
FIG. 18 is a side perspective view of a portion of the aircraft showing one of the valances coupled to the corresponding stowage bin assembly and stowage bin lighting assemblies in accordance with an exemplary embodiment.
Figure 19:
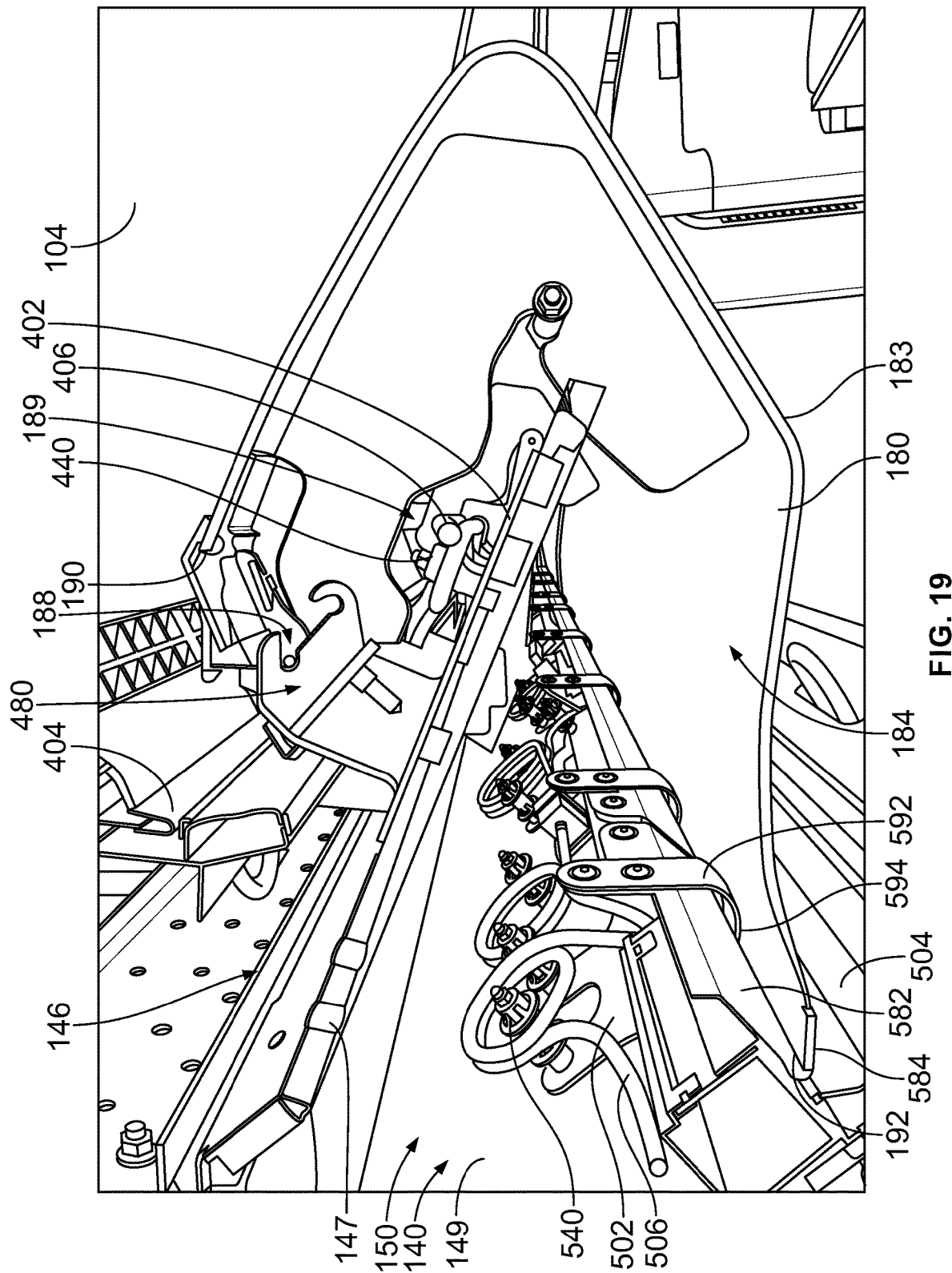
FIG. 19 is a side perspective view of a portion of the aircraft showing one of the valances coupled to the corresponding stowage bin assembly and stowage bin lighting assemblies in accordance with an exemplary embodiment.

FIG. 18 is a side perspective view of a portion of the aircraft 110 showing one of the valances 180 coupled to the corresponding stowage bin assembly 140 and stowage bin lighting assemblies 150 in accordance with an exemplary embodiment. FIG. 19 is a side perspective view of a portion of the aircraft 110 showing one of the valances 180 coupled to the corresponding stowage bin assembly 140 and stowage bin lighting assemblies 150 in accordance with an exemplary embodiment.

The upper and lower stowage bin lighting assemblies 150 are coupled to the upper portion 146 of the stowage bin assembly 140. In an example, the upper stowage bin lighting assembly 150 is coupled to a first wall 147 and the lower stowage bin lighting assembly 150 is coupled to a second wall 149. However, the upper and lower stowage bin lighting assemblies 150 may be coupled to the same wall of the stowage bin assembly 140 in other embodiments. In an exemplary embodiment, the upper chassis 402 holds the upper light 404 behind and above the valance support such that the light from the upper light 404 may be directed toward the ceiling 104 to illuminate the ceiling 104. In an exemplary embodiment, the lower chassis 502 holds the lower light 504 below and in front of the lower edge of the valance 180 such that the light from the lower light 504 may be directed toward the outer surface 183 of the valance 180 along the bottom of the valance 180 to illuminate the valance 180. The upper and lower wires 406, 506 are located behind the valance 180, such as in the valance pocket 184. The wires 406, 506 are organized and held in place by the wire standoffs 440, 540.

During assembly, the valance 180 is initially coupled to the valance support 580 of the lower stowage bin lighting assembly 150. The lower edge 192 is coupled to the rail 582. For example, the lower edge 192 is received in the pocket of the lip 584 at the bottom edge of the rail 582. The spring clips 592 hold the lower edge 192 in the pocket of the lip 584. The clip ends 594 of the spring clips 592 press against and hold the lower edge 192 against the lip 584. The lower edge 192, being captured in the pocket, is not visible to the passengers in the cabin. In other embodiments, the upper edge 190 may additionally or alternatively be captured by a rail and spring clips in a similar manner as described herein relating to the lower edge 192.

The latching element 188, at the upper edge 190 of the valance 180, is shown latchably coupled to the valance latch 480 of the upper stowage bin lighting assembly 150. The guide roller 187 guides mating of the latching element 188 with the valance latch 480. For example, the cam surface 186 formed in the rib 185 rides along the guide roller 187 to guide the latching element 188 into latching engagement with the valance latch 480. The cam surface 186 has a profiled surface that guides the latching element 188 into the valance latch 480 as the valance 180 is rotated in the mating direction. In an exemplary embodiment, the rib 185 includes a wire cutout 189 for the wires 404 to pass through the rib 185. The latching element 188 is visibly hidden from passenger view by the valance 180. The latching element 188 may be released from above the valance 180. In various embodiments, the valance 180 is removable without the use of tools.

With reference back to FIGS. 1-19, systems and methods for installing lighting components and a valance within an internal cabin of an aircraft is provided. The systems and methods allow for ease of installation of lighting and valance components to a stowage bin assembly in an aircraft. For example, the systems and methods provide for assembly of various components outside of the aircraft, such as on a workbench, where the components may be quickly assembled and assembly may be precision controlled and tailored to the stowage bin assembly configuration. The assembled unit, with the lighting and wiring, is installed in the aircraft in a single step without the need to assemble the lighting or wiring in place in the aircraft. The valance is configured to be assembled in place in the aircraft. In various examples, the valance may be blind mated to the supports without the use of tools for quick and easy installation. The systems and methods allow installation of different lighting and valance configurations onto different stowage bin assemblies due to changes in the shape of the cabin along the fuselage.

Certain embodiments provide a stowage bin lighting assembly for mounting to an internal cabin of a vehicle. The stowage bin lighting assembly includes a chassis including a plate extending longitudinally between a first end and a second end and configured to be mounted to a stowage bin assembly of the internal cabin. The chassis supports light mount pedestals and wire standoffs. The stowage bin lighting assembly includes a light assembly removably coupled to the chassis. The light assembly includes a light and a wire electrically connected to the light. The light is coupled to the light mount pedestals for providing lighting from the stowage bin assembly to the internal cabin of the vehicle. The wire supplies power to the light and is coupled to at least one of the wire standoffs to control a position of the wire.

In at least one example, the light and the wire of the stowage bin lighting assembly are pre-assembled to the chassis prior to mounting the chassis to the stowage bin assembly.

In at least one example, the light mount pedestals of the stowage bin lighting assembly provide multiple attachment points for the light and the plate maintains spacing of the light mount pedestals relative to each other. In various examples, each light mount pedestal includes an alignment mounting feature supporting a portion of the light. The alignment mounting features may be offset relative to each other and relative to a longitudinal fuselage axis of the vehicle. The alignment mounting features of the light mount pedestals may define a longitudinal mounting axis tapered transversely relative to the longitudinal fuselage axis. The light is held along the longitudinal mounting axis. Each alignment mounting feature may have a height that is different from a height of at least one other alignment mounting feature to vertically taper the longitudinal mounting axis relative to the longitudinal fuselage axis. Each alignment mounting feature may have a height that is different from a height of at least one other alignment mounting feature such that the longitudinal mounting axis is vertically tapered relative to the longitudinal fuselage axis. Each alignment mounting feature may include an angled mounting surface formed at an angle relative to an upper surface of the plate. The angled mounting surface may be formed at a different angle relative to at least one other angled mounting surface. All the angled mounting surfaces define the longitudinal mounting axis. In various examples, the light mount pedestals have different heights to locate the light at different distances from an upper surface of the plate such as to orient the light to extend along the longitudinal mounting axis.

In at least one example, the plate of the stowage bin lighting assembly includes a step feature configured to span across a gap from the stowage bin assembly to an adjacent stowage bin assembly.

In at least one example, the chassis of the stowage bin lighting assembly includes a wire guide boss extending from an upper surface of the plate supporting a wire guide on the chassis for controlling routing of the wire between the light and the wire standoffs.

In at least one example, the wire is coiled around at least two of the wire standoffs.

In at least one example, the chassis of the stowage bin lighting assembly includes a wire disconnect mounting bracket. The wire has a wire disconnect at an end of the wire that is coupled to the wire disconnect mounting bracket to position the wire disconnect relative to the chassis.

In at least one example, the light is a first light. The light assembly further includes a second light mounted to the corresponding light mount pedestals. The light mount pedestals position the first light adjacent the second light on the chassis. The first light extends along a first axis and the second light extends along a second axis. The light mount pedestals may hold the first and second lights with the first axis congruent with the second axis.

In at least one example, the light mount pedestals are integral with the plate.

In at least one example, the chassis of the stowage bin lighting assembly includes at least one valance support supported by the chassis. A valance is coupled to the at least one valance support. The valance is configured to be coupled to the stowage bin assembly by the valance support. In an example, the valance support includes a rail and a plurality of spring clips coupled to the rail. A lower edge of the valance is coupled between the rail and the spring clips. The rail may include a lip. The spring clips may include mounting ends coupled to the rail and clip ends opposite the mounting ends facing the lip. The lower edge of the valance may be captured between the lip and the clip ends of the spring clips. In an example, the valance includes a valance panel including an inner surface and an outer surface. The inner surface forms a valance pocket. The valance includes ribs in the valance pocket supporting the valance panel. The ribs may include cam surfaces configured to engage guide rollers extending from the stowage bin assembly to control mating of the valance to the valance support. In an example, the valance support includes valance latches. The valance is latchably coupled to the valance latches. In an example, the chassis further includes valance mount pedestals extending from an upper surface of the plate. The valance latches are coupled to the corresponding valance mount pedestals. The valance mount pedestals position the plurality of valance latches relative to the plate. In an example, each valance mount pedestal includes an alignment mounting feature supporting the corresponding valance latch. The alignment mounting features are offset relative to each other and relative to a longitudinal fuselage axis of the vehicle. The alignment mounting features of the valance mount pedestals may define a longitudinal mounting axis tapered transversely relative to the longitudinal fuselage axis. The valance is held along the longitudinal mounting axis.

Certain embodiments provide a stowage bin lighting assembly for mounting to an internal cabin of a vehicle. The stowage bin lighting assembly includes a chassis including a plate extending longitudinally between a first end and a second end. The plate has an upper surface and a lower surface configured to be mounted to a stowage bin assembly of the internal cabin. The chassis supports light mount pedestals above the upper surface. The chassis supports wire standoffs above the upper surface. The chassis supports at least one valance support above the upper surface. The stowage bin lighting assembly includes a light mounted to the light mount pedestals. The light is positioned above the plate by the light mount pedestals for providing lighting from the stowage bin assembly to the internal cabin of the vehicle. The stowage bin lighting assembly includes a wire electrically connected to the light to supply power and/or data to the light. The wire is coupled to at least one of the wire standoffs to control a position of the wire relative to the plate. The stowage bin lighting assembly includes a valance coupled to the valance mount pedestals. The valance is configured to be coupled to the stowage bin assembly by the valance support.

Certain embodiments provide a vehicle having an internal cabin having a ceiling, a plurality of stowage bin assemblies within the internal cabin each having an upper portion facing the ceiling, and a plurality of stowage bin lighting assemblies coupled to the stowage bin assemblies at the upper portions of the corresponding stowage bin assemblies. Each stowage bin lighting assembly includes a chassis including a plate extending longitudinally between a first end and a second end. The chassis is mounted to the corresponding stowage bin assembly of the internal cabin. The chassis supports light mount pedestals and wire standoffs. Each stowage bin lighting assembly includes a light assembly removably coupled to the chassis. The light assembly includes a light and a wire electrically connected to the light. The light is coupled to the light mount pedestals for providing lighting from the stowage bin assembly to the internal cabin of the vehicle. The wire supplies power to the light. The wire is coupled to at least one of the wire standoffs to control a position of the wire.

Certain embodiments provide a vehicle including an internal cabin having a ceiling, a stowage bin assembly within the internal cabin, and a stowage bin lighting assembly. The stowage bin assembly has an upper portion facing the ceiling and a pocket formed between the upper portion of the stowage bin assembly and the ceiling. The stowage bin lighting assembly is received in the pocket. The stowage bin lighting assembly includes an upper light assembly, a lower light assembly, and a valance coupled between the upper light assembly and the lower light assembly. The upper light assembly includes an upper chassis coupled to the upper portion of the stowage bin assembly. The upper chassis includes an upper plate extending longitudinally between a first end and a second end. The upper chassis supports upper light mount pedestals above the upper plate. The upper light assembly includes an upper light mounted to the upper light mount pedestals. The upper chassis supports upper valance latches above the upper chassis. The lower light assembly includes a lower chassis coupled to the upper portion of the stowage bin assembly independent from the upper chassis. The lower chassis includes a lower plate extending longitudinally between a first end and a second end. The lower chassis supports lower light mount pedestals above the lower plate. The lower light assembly includes a lower light mounted to the lower light mount pedestals. The lower chassis supports a lower valance support above the lower chassis. The valance is coupled to the lower valance support and coupled to the upper valance latches to control a position of the valance relative to the stowage bin assembly.

Certain embodiments of the present disclosure provide a method of lighting a stowage bin assembly in an internal cabin of an aircraft. The method includes the steps of coupling a light to a plurality of light mount pedestals extending from a chassis at a location outside of the internal cabin, coupling a wire extending from the light to a plurality of wire standoffs extending from the chassis at a location outside of the internal cabin, and mounting the chassis to an upper portion of the stowage bin assembly inside the internal cabin to locate the light and the wire above the stowage bin assembly.

In at least one example, the method includes the step of inspecting the installation of the light and the wire on the chassis at a location outside of the internal cabin prior to mounting the chassis to the upper portion of the stowage bin assembly inside the internal cabin.

In at least one example, the method includes the steps of unmounting the chassis, with the light and the wire mounted to the chassis, from the stowage bin assembly, removing the chassis, with the light and the wire mounted to the chassis, from the internal cabin, replacing the light and the wire on the chassis, and mounting the chassis, with the replaced light and wire, to an upper portion of the stowage bin assembly inside the internal cabin to locate the light and the wire above the stowage bin assembly.

In at least one example, the method includes the step of coupling at least one valance support to the chassis at a location outside of the internal cabin and coupling a valance to the at least one valance support to secure the valance to the stowage bin assembly and cover the pocket. The at least one valance support may include a valance latch and the valance may include a cam surface. The step of coupling the valance to the at least one valance support includes engaging the cam surface with a guide roller to guide mating of the valance with the valance latch.

In at least one example, the step of mounting the chassis to the upper portion of the stowage bin assembly includes mounting the chassis to the upper portion of the stowage bin assembly such that the light is held along a longitudinal mounting axis tapered transversely relative to a longitudinal fuselage axis of the internal cabin.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A stowage bin lighting assembly for mounting to an internal cabin of a vehicle, comprising:
   a chassis including a plate extending longitudinally between a first end and a second end and mounted directly to a stowage bin assembly of the internal cabin, the chassis supporting light mount pedestals and wire standoffs;
   a light assembly removably coupled to the chassis, the light assembly including a light and a wire electrically connected to the light, the light coupled to the light mount pedestals for providing lighting from the stowage bin assembly to the internal cabin of the vehicle, the wire supplying power to the light, the wire being coupled to at least one of the wire standoffs to control a position of the wire.

2. The stowage bin lighting assembly of claim 1, wherein the light and the wire are pre-assembled to the chassis prior to mounting the chassis to the stowage bin assembly.

3. The stowage bin lighting assembly of claim 1, wherein the light mount pedestals provide multiple attachment points for the light, the plate maintaining spacing of the light mount pedestals relative to each other.

4. The stowage bin lighting assembly of claim 1, wherein each light mount pedestal comprises an alignment mounting feature supporting a portion of the light, wherein the alignment mounting features are offset relative to each other and relative to a longitudinal fuselage axis of the vehicle, the alignment mounting features of the light mount pedestals define a longitudinal mounting axis tapered transversely relative to the longitudinal fuselage axis, the light held along the longitudinal mounting axis.

5. The stowage bin lighting assembly of claim 4, wherein each alignment mounting feature comprises a height that is different from a height of at least one other alignment mounting feature such that the longitudinal mounting axis is vertically tapered relative to the longitudinal fuselage axis.

6. The stowage bin lighting assembly of claim 4, wherein each alignment mounting feature comprises an angled mounting surface formed at an angle relative to an upper surface of the plate, wherein each angled mounting surface is formed at a different angle relative to at least one other angled mounting surface, and wherein all the angled mounting surfaces define the longitudinal mounting axis.

7. The stowage bin lighting assembly of claim 1, wherein the light mount pedestals have different heights such that the light extends along the longitudinal mounting axis.

8. The stowage bin lighting assembly of claim 1, wherein the plate includes a step feature, the step feature configured to span across a gap from the stowage bin assembly to an adjacent stowage bin assembly.

9. The stowage bin lighting assembly of claim 1, wherein the chassis includes a wire guide boss extending from an upper surface of the plate, the wire guide boss supporting a wire guide on the chassis, the wire guide controlling routing of the wire between the light and the wire standoffs.

10. The stowage bin lighting assembly of claim 1, wherein the wire is coiled around at least two of the wire standoffs.

11. The stowage bin lighting assembly of claim 1, wherein the chassis includes a wire disconnect mounting bracket, the wire having a wire disconnect at an end of the wire, the wire disconnect coupled to the wire disconnect mounting bracket to position the wire disconnect relative to the chassis.

12. The stowage bin lighting assembly of claim 1, wherein the light is a first light, the light assembly further comprising a second light mounted to the corresponding light mount pedestals, the light mount pedestals positioning the first light adjacent the second light on the chassis.

13. The stowage bin lighting assembly of claim 12, wherein the first light extends along a first axis and the second light extends along a second axis, the light mount pedestals holding the first and second lights with the first axis congruent with the second axis.

14. The stowage bin lighting assembly of claim 1, wherein the light mount pedestals are integral with the plate.

15. The stowage bin lighting assembly of claim 1, wherein the chassis includes at least one valance support supported by the chassis, a valance coupled to the at least one valance support, wherein the valance is configured to be coupled to the stowage bin assembly by the valance support.

16. The stowage bin lighting assembly of claim 15, wherein the valance support includes a rail and a plurality of spring clips coupled to the rail, a lower edge of the valance being coupled between the rail and the spring clips.

17. The stowage bin lighting assembly of claim 16, wherein the rail includes a lip, the spring clips including mounting ends coupled to the rail and clip ends opposite the mounting ends facing the lip, the lower edge of the valance being captured between the lip and the clip ends of the spring clips.

18. The stowage bin lighting assembly of claim 15, wherein the valance includes a valance panel including an inner surface and an outer surface, the inner surface forming a valance pocket, the valance including ribs in the valance pocket supporting the valance panel, the ribs including cam surfaces configured to engage guide rollers extending from the stowage bin assembly to control mating of the valance to the valance support.

19. The stowage bin lighting assembly of claim 15, wherein the valance support includes valance latches, the valance being latchably coupled to the valance latches.

20. The stowage bin lighting assembly of claim 19, wherein the chassis further comprises valance mount pedestals extending from an upper surface of the plate, the valance latches being coupled to the corresponding valance mount pedestals, the valance mount pedestals positioning the plurality of valance latches relative to the plate.

21. The stowage bin lighting assembly of claim 20, wherein each valance mount pedestal comprises an alignment mounting feature supporting the corresponding valance latch, wherein the alignment mounting features are offset relative to each other and relative to a longitudinal fuselage axis of the vehicle, the alignment mounting features of the valance mount pedestals define a longitudinal mounting axis tapered transversely relative to the longitudinal fuselage axis, the valance held along the longitudinal mounting axis.

22. A stowage bin lighting assembly for mounting to an internal cabin of a vehicle, comprising:
- a chassis including a plate extending longitudinally between a first end and a second end, the plate having an upper surface and a lower surface, the lower surface mounted directly to a stowage bin assembly of the internal cabin, the chassis supporting light mount pedestals above the upper surface, the chassis supporting wire standoffs above the upper surface, the chassis supporting at least one valance support above the upper surface;
- a light mounted to the light mount pedestals, the light being positioned above the plate by the light mount pedestals for providing lighting from the stowage bin assembly to the internal cabin of the vehicle;
- a wire electrically connected to the light to supply power to the light, the wire being coupled to at least one of the wire standoffs to control a position of the wire relative to the plate; and
- a valance coupled to the valance mount pedestals, wherein the valance is configured to be coupled to the stowage bin assembly by the valance support.

23. The stowage bin lighting assembly of claim 22, wherein the valance support includes a rail and a plurality of spring clips coupled to the rail, a lower edge of the valance being coupled between the rail and the spring clips.

24. The stowage bin lighting assembly of claim 23, wherein the rail includes a lip, the spring clips including mounting ends coupled to the rail and clip ends opposite the mounting ends facing the lip, the lower edge of the valance being captured between the lip and the clip ends of the spring clips.

25. The stowage bin lighting assembly of claim 22, wherein the valance support includes valance latches, the valance being latchably coupled to the valance latches.

26. The stowage bin lighting assembly of claim 22, wherein the chassis further comprises valance mount pedestals extending from an upper surface of the plate and a plurality of valance latches coupled to the corresponding valance mount pedestals, the valance mount pedestals positioning the plurality of valance latches relative to the plate.

27. The stowage bin lighting assembly of claim 26, wherein each valance mount pedestal comprises an alignment mounting feature supporting the corresponding valance latch, wherein the alignment mounting features are offset relative to each other and relative to a longitudinal fuselage axis of the vehicle, the alignment mounting features of the valance mount pedestals define a longitudinal mounting axis tapered transversely relative to the longitudinal fuselage axis, the valance held along the longitudinal mounting axis.

28. The stowage bin lighting assembly of claim 22, wherein the valance includes a valance panel including an inner surface and an outer surface, the inner surface forming a valance pocket, the valance including ribs in the valance pocket supporting the valance panel, the ribs including cam surfaces configured to engage guide rollers extending from the stowage bin assembly to control mating of the valance to the valance support.

29. The stowage bin lighting assembly of claim 22, wherein the light and the wire are pre-assembled to the chassis prior to mounting the chassis to the stowage bin assembly, the valance being coupled to the valance support after the chassis is mounted to the stowage bin assembly.

30. The stowage bin lighting assembly of claim 22, wherein the wire is coiled around at least two of the wire standoffs, the locations of the wire standoffs controlling positioning of the coil relative to the plate.

31. The stowage bin lighting assembly of claim 22, wherein the light is a first light, the light assembly further comprising a second light mounted to the corresponding light mount pedestals, the light mount pedestals positioning the first light adjacent the second light on the chassis.

32. The stowage bin lighting assembly of claim 22, wherein each light mount pedestal comprises an alignment mounting feature supporting a portion of the light, wherein the alignment mounting features are offset relative to each other and relative to a longitudinal fuselage axis of the vehicle, the alignment mounting features of the light mount pedestals define a longitudinal mounting axis tapered transversely relative to the longitudinal fuselage axis, the light held along the longitudinal mounting axis.

33. The stowage bin lighting assembly of claim 32, wherein each alignment mounting feature comprises a height that is different from a height of at least one other alignment mounting feature to vertically taper the longitudinal mounting axis relative to the longitudinal fuselage axis.

34. A vehicle, comprising:
- an internal cabin having a ceiling;
- a plurality of stowage bin assemblies within the internal cabin, each stowage bin assembly having an upper portion facing the ceiling; and
- a plurality of stowage bin lighting assemblies coupled to the stowage bin assemblies at the upper portions of the corresponding stowage bin assemblies, each stowage bin lighting assembly comprising:
- a chassis including a plate extending longitudinally between a first end and a second end, the chassis being mounted directly to the corresponding stowage bin assembly of the internal cabin, the chassis supporting light mount pedestals and wire standoffs; a light assembly removably coupled to the chassis, the light assembly including a light and a wire electrically connected to the light, the light coupled to the light mount pedestals for providing lighting from the stowage bin assembly to the internal cabin of the vehicle, the wire is coupled to at least one of the wire standoffs to control a position of the wire.

35. The vehicle of claim 34, wherein the light and the wire are pre-assembled to the chassis prior to mounting the chassis to the corresponding stowage bin assembly.

36. The vehicle of claim 34, wherein the plate includes a step feature, the step feature configured to span across adjacent stowage bin assemblies.

37. The vehicle of claim 34, wherein the light is a first light, the light assembly further comprising a second light mounted to the corresponding light mount pedestals, the light mount pedestals positioning the first light adjacent the second light on the chassis.

38. The vehicle of claim 34, wherein the chassis includes at least one valance support coupled to the chassis, a valance coupled to the at least one valance support, wherein the valance is coupled to the corresponding stowage bin assembly by the valance support.

39. A vehicle, comprising:
   an internal cabin having a ceiling;
   a stowage bin assembly within the internal cabin, the stowage bin assembly having an upper portion facing the ceiling, a pocket being formed between the upper portion of the stowage bin assembly and the ceiling; and
   a stowage bin lighting assembly received in the pocket, the stowage bin lighting assembly including an upper light assembly, a lower light assembly, and a valance coupled between the upper light assembly and the lower light assembly;
   the upper light assembly including an upper chassis being directly coupled to the upper portion of the stowage bin assembly, the upper chassis including an upper plate extending longitudinally between a first end and a second end, the upper chassis supporting upper light mount pedestals above the upper plate, the upper light assembly including an upper light mounted to the upper light mount pedestals, the upper chassis supporting upper valance latches above the upper chassis; the lower light assembly including a lower chassis being directly coupled to the upper portion of the stowage bin assembly independent from the upper chassis, the lower chassis including a lower plate extending longitudinally between a first end and a second end, the lower chassis supporting lower light mount pedestals above the lower plate, the lower light assembly including an lower light mounted to the lower light mount pedestals, the lower chassis supporting a lower valance support above the lower chassis;
   the valance coupled to the lower valance support and coupled to the upper valance latches to control a position of the valance relative to the stowage bin assembly.

40. The vehicle of claim 39, wherein the upper light and an upper wire extending from the upper light are pre-assembled to the upper chassis prior to mounting the upper chassis to the stowage bin assembly, and wherein the lower light and a lower wire extending from the lower light are pre-assembled to the lower chassis prior to mounting the lower chassis to the stowage bin assembly.

41. The vehicle of claim 39, wherein the upper chassis is mounted to the stowage bin assembly separate from the lower chassis.

42. A method of lighting a stowage bin assembly in an internal cabin of a vehicle, the method comprising:
   coupling a light to a plurality of light mount pedestals extending from a chassis at a location outside of the internal cabin;
   coupling a wire extending from the light to a plurality of wire standoffs extending from the chassis at a location outside of the internal cabin;
   mounting the chassis directly to an upper portion of the stowage bin assembly inside the internal cabin to locate the light and the wire above the stowage bin assembly.

43. The method of claim 42, further comprising inspecting the installation of the light and the wire on the chassis at a location outside of the internal cabin prior to mounting the chassis to the upper portion of the stowage bin assembly.

44. The method of claim 42, further comprising:
   unmounting the chassis, with the light and the wire mounted to the chassis, from the stowage bin assembly;
   removing the chassis, with the light and the wire mounted to the chassis, from the internal cabin;
   replacing the light and the wire on the chassis; and
   mounting the chassis, with the replaced light and wire, to an upper portion of the stowage bin assembly inside the internal cabin to locate the light and the wire above the stowage bin assembly.

45. The method of claim 42, further comprising coupling at least one valance support to the chassis at a location outside of the internal cabin and coupling a valance to the at least one valance support to secure the valance to the stowage bin assembly and cover the pocket.

46. The method of claim 45, wherein the at least one valance support includes a valance latch, the valance including a cam surface, said coupling the valance to the at least one valance support comprises engaging the cam surface with a guide roller to guide mating of the valance with the valance latch.

47. The method of claim 42, wherein said mounting the chassis to the upper portion of the stowage bin assembly comprises mounting the chassis to the upper portion of the stowage bin assembly such that the light is held along a longitudinal mounting axis tapered transversely relative to a longitudinal fuselage axis of the internal cabin.

\* \* \* \* \*